US012115435B2

(12) United States Patent
Beers

(10) Patent No.: US 12,115,435 B2
(45) Date of Patent: Oct. 15, 2024

(54) ARTICLE OF APPAREL WITH DYNAMIC PADDING SYSTEM

(71) Applicant: NIKE, Inc., Beaverton, OR (US)

(72) Inventor: Tiffany A. Beers, Beaverton, OR (US)

(73) Assignee: NIKE, Inc., Beaverton, OR (US)

( * ) Notice: Subject to any disclaimer, the term of this patent is extended or adjusted under 35 U.S.C. 154(b) by 0 days.

(21) Appl. No.: 17/902,451

(22) Filed: Sep. 2, 2022

(65) Prior Publication Data

US 2022/0409982 A1 Dec. 29, 2022

Related U.S. Application Data

(62) Division of application No. 15/877,151, filed on Jan. 22, 2018, now Pat. No. 11,465,033, which is a division of application No. 14/258,613, filed on Apr. 22, 2014, now Pat. No. 9,908,027.

(51) Int. Cl.

| | |
|---|---|
| ***A41D 13/015*** | (2006.01) |
| ***A41D 13/05*** | (2006.01) |
| ***A63B 71/12*** | (2006.01) |
| ***G08C 17/02*** | (2006.01) |

(52) U.S. Cl.

CPC ............ *A63B 71/12* (2013.01); *A41D 13/015* (2013.01); *A41D 13/05* (2013.01); *A41D 13/0506* (2013.01); *A41D 13/0512* (2013.01); *A41D 13/0543* (2013.01); *A63B 71/1216* (2013.01); *A63B 71/1225* (2013.01); *G08C 17/02* (2013.01); *A63B 2071/1208* (2013.01); *A63B 2071/1233* (2013.01); *A63B 2071/1241* (2013.01); *A63B 2220/833* (2013.01); *A63B 2220/836* (2013.01); *A63B 2220/89* (2013.01)

(58) Field of Classification Search

CPC .......... A41D 13/015; A63B 71/12; F41H 1/02

USPC .............................................................. 2/209

See application file for complete search history.

(56) References Cited

U.S. PATENT DOCUMENTS

| | | | |
|---|---|---|---|
| 3,134,106 | A | 5/1964 | Archie et al. |
| 4,977,623 | A | 12/1990 | Demarco |
| 6,012,162 | A | 1/2000 | Bullat |
| 6,032,299 | A | 3/2000 | Welsh |
| 6,109,394 | A | 8/2000 | Messenger |
| 6,119,516 | A | 9/2000 | Hock |

(Continued)

FOREIGN PATENT DOCUMENTS

WO 2008/033963 A2 3/2008

OTHER PUBLICATIONS

European Search Report and Search Opinion received for European Application No. 19190120.6, mailed on Sep. 27, 2019, 7 pages.

*Primary Examiner* — Timothy K Trieu

(74) *Attorney, Agent, or Firm* — Shook, Hardy & Bacon L.L.P.

(57) ABSTRACT

An article of apparel includes a padding system that dynamically changes configuration in response to an impending impact. The padding system may change from a state that has a high flexibility and offers low protection from impact to a state that has a low flexibility and offers increase protection from impact. The system may use a filament to constrict a plurality of padding elements together in order to increase the overall stiffness of the pad. The filament may be tightened and loosened by a spool. The spool may receive a signal regarding the impending impact from a sensor that is a part of the article of apparel, or a sensor that is separate from it.

14 Claims, 18 Drawing Sheets

(56) References Cited

U.S. PATENT DOCUMENTS

| | | | |
|---|---|---|---|
| 6,198,394 | B1 | 3/2001 | Jacobsen et al. |
| 6,722,692 | B2 | 4/2004 | Fukaya et al. |
| 6,743,325 | B1 | 6/2004 | Taylor |
| 6,819,247 | B2 | 11/2004 | Birnbach et al. |
| 6,969,548 | B1 | 11/2005 | Goldfine |
| 7,150,048 | B2 | 12/2006 | Buckman |
| 7,954,204 | B2 | 6/2011 | Hammerslag et al. |
| 7,991,986 | B2 | 8/2011 | Yamamoto et al. |
| 8,092,398 | B2 | 1/2012 | Weinberg et al. |
| 8,402,568 | B2 | 3/2013 | Alstin et al. |
| 8,624,787 | B2 | 1/2014 | Druyan et al. |
| 9,101,323 | B2 | 8/2015 | Einarsson |
| 9,149,084 | B2 | 10/2015 | Turner |
| 9,221,128 | B2 | 12/2015 | Jeong |
| 9,227,128 | B1 | 1/2016 | Carfagna, Jr. |
| 9,352,531 | B2 | 5/2016 | Berns et al. |
| 2001/0023504 | A1 | 9/2001 | Yoon |
| 2003/0182040 | A1 | 9/2003 | Davidson |
| 2005/0081277 | A1 | 4/2005 | Matechen et al. |
| 2006/0113147 | A1 | 6/2006 | Harris |
| 2007/0264905 | A1 | 11/2007 | Torta et al. |
| 2008/0066272 | A1 | 3/2008 | Hammerslag et al. |
| 2008/0113143 | A1 | 5/2008 | Taylor |
| 2008/0114143 | A1 | 5/2008 | Brothers et al. |
| 2009/0064396 | A1 | 3/2009 | Ghajar |
| 2009/0070911 | A1 | 3/2009 | Chang |
| 2009/0287128 | A1 | 11/2009 | Ingimundarson et al. |
| 2010/0129573 | A1 | 5/2010 | Kim |
| 2010/0281606 | A1 | 11/2010 | Kordecki |
| 2011/0061154 | A1 | 3/2011 | Turner et al. |
| 2011/0072566 | A1* | 3/2011 | Kovacevich .............. F41H 1/02 2/2.5 |
| 2011/0277225 | A1 | 11/2011 | Salkind et al. |
| 2012/0004587 | A1 | 1/2012 | Nickel et al. |
| 2012/0052249 | A1* | 3/2012 | Turner ..................... A43D 8/06 156/256 |
| 2012/0137290 | A1* | 5/2012 | Berg .................. G06F 9/45504 718/1 |
| 2012/0167290 | A1 | 7/2012 | Kovacevich et al. |
| 2012/0216327 | A1* | 8/2012 | Turner ............... A41D 13/0593 2/69 |
| 2012/0246795 | A1 | 10/2012 | Scheffler et al. |
| 2013/0125295 | A1 | 5/2013 | Krueger |
| 2013/0203319 | A1 | 8/2013 | Torres et al. |
| 2013/0302554 | A1 | 11/2013 | Kim |
| 2014/0259301 | A1 | 9/2014 | Berns et al. |
| 2014/0259323 | A1 | 9/2014 | Brandt et al. |
| 2015/0075697 | A1 | 3/2015 | Gildersleeve |
| 2015/0101899 | A1 | 4/2015 | Russo |
| 2015/0164154 | A1 | 6/2015 | Bencini |
| 2015/0208750 | A1 | 7/2015 | White |
| 2015/0296922 | A1 | 10/2015 | Rushbrook et al. |
| 2015/0297973 | A1 | 10/2015 | Beers |
| 2016/0150835 | A1 | 6/2016 | Salmini et al. |
| 2016/0221297 | A1 | 8/2016 | Carr-Seaman et al. |
| 2018/0140928 | A1 | 5/2018 | Beers |

* cited by examiner

ARTICLE OF APPAREL WITH DYNAMIC PADDING SYSTEM

CROSS-REFERENCE TO RELATED APPLICATIONS

This application is a divisional application which claims priority to U.S. application Ser. No. 15/877,151, entitled "Article of Apparel with Dynamic Padding System," filed Jan. 22, 2018. U.S. application Ser. No. 15/877,151 is a divisional application which claims priority to U.S. application Ser. No. 14/258,613, entitled "Article of Apparel with Dynamic Padding System," filed Apr. 22, 2014. The entirety of both of the aforementioned applications are incorporated herein by reference.

BACKGROUND OF THE INVENTION

The present disclosure relates to articles of apparel that may be used for protective purposes in athletic activities.

A wide range of articles of apparel are known to be used in various sports. Generally, articles of apparel may be designed to address a variety of issues that may arise when engaging in sporting or exercise activities. For example, articles of apparel may be designed to address comfort, temperature regulation, friction, and protection. In particular, many sports use articles of apparel that include protective padding. Protective padding may be used in order to ensure the wearer's safety in the event of an impact with another player, or an impact with a ball or other sporting equipment.

Articles of apparel with protective padding are usually tailored to the needs of a specific sport. For example, football pads, hockey pads, and lacrosse pads are generally not interchangeable. However, articles of apparel with protective padding such as these may share certain general design goals. Namely, articles of apparel with protective padding generally seek to minimize bulkiness and increase flexibility, while still maintaining the necessary amount of protectiveness.

In general, the goal of providing increased flexibility may be difficult to balance with the goal of providing impact protection. A more flexible pad may transmit an impact force to the body of the wearer, risking potential injury. In contrast, a less flexible (more stiff) pad may absorb the impact force, but the stiffness may hinder the wearer's range of motion. Accordingly, a balance between these two design goals may be reached based on the types of impacts experienced and the necessary range of motion in a particular sport.

An article of apparel that is configured to change its flexibility and impact resistance as needed could potentially address a variety of these issues. Several examples exist in the art of attempts to provide such articles of apparel.

One example is shown in U.S. Patent Application Publication No. 2003/0182040 to Davidson. The Davidson disclosure is directed to an impact minimization device that uses a sensor or a system of sensors associated with a processor that determines if an impact may occur based upon analysis of information received from the sensors. When the processor determines that an impact is imminent, the processor sends a signal to a trigger that triggers a gas source that inflates an inflatable member. The inflatable member provides protection from the impending impact. The inflatable member may be provided as part of a wearable garment. The disclosure of U.S. Patent Application Publication No. 2003/0182040 to Davidson is hereby incorporated by reference in its entirety.

Another example is shown in U.S. Pat. No. 7,150,048 to Buckman. The Buckman disclosure is directed to a system for impact protection on garments. When the sensors detect the start of a fall, the system quickly activates to protect sensitive areas. The protection may take the form of an inflatable or extendible protective element. For example, when a fall is detected the garment quickly inflates so that the wearer can land on a cushion, as shown in the embodiment with an inflatable pair of shorts. U.S. Pat. No. 7,150,048 to Buckman is hereby incorporated by reference in its entirety.

However, known articles of apparel such as these do not necessarily provide all the advantages that may be desired or needed in order for the article of apparel to be used when playing sports. In particular, professional-level sports may require a certain level of flexibility and a certain level of protection from impact in order to both comply with governing body regulations and to accord with professional players' preferences.

Therefore, there exists a need in the art for an article of apparel with a dynamic padding system that balances the need for flexibility with the need for protection from impacts when engaging in athletic activities.

BRIEF SUMMARY OF THE INVENTION

Generally, this disclosure is directed to articles of apparel with padding systems that are configured to change from a first configuration to a second configuration. An article of apparel with this ability to change from a first configuration to a second configuration may be referred as "dynamic." The first configuration may be flexible with low protection, while the second configuration may be stiff with high protection. The flexible state allows for increased range of motion, while the stiff state provides increased protection from impact. The change occurs in a manner that is quick, reversible, and repeatable. The padding system may be configured to change in response to an impending impact, prior to the impact taking place.

In one aspect, this disclosure provides an article of apparel comprising: a dynamic padding system, the dynamic padding system including a pad, a spool, and a filament; wherein the filament is wound around the spool and extends through the pad; wherein the spool is configured to reversibly wind the filament from a first length within the pad to a second length within the pad; wherein the dynamic padding system is configured to reversibly change from a first state to a second state, the first state being associated with the first length of filament within the pad and the second state being associated with the second length of filament within the pad; the first state being associated with a first stiffness, the second state being associate with a stiffness, the second stiffness being different from the first stiffness.

In another aspect, this disclosure provides an article of apparel comprising: a dynamic padding system including a plurality of padding elements fixedly mounted on a base layer, a filament surrounding two or more of the padding elements, a spool, a portion of the filament being wound around the spool, and an input source that is configured to deliver an input to the spool; wherein the spool is configured to reversibly change the filament from a first configuration to a second configuration upon receiving the input from the input source; and wherein the two or more padding elements which are surrounded by the filament have a first distance between them when the filament is in the first configuration, and have a second distance between them when the filament is in the second configuration, where the second distance is less than the first distance.

In a third aspect, this disclosure provides an athletic equipment system comprising: an article of apparel including a dynamic padding system; and a sensor; wherein the dynamic padding system includes a plurality of padding elements fixedly mounted on a base layer, a filament surrounding two or more of the padding elements, a spool, a portion of the filament being wound around the spool, the spool being configured to receive an input originating from the sensor; wherein the sensor is configured to sense the position and velocity of a user wearing the article of apparel, sense the position and velocity of a target, compare the position and velocity of the user with the position and velocity of the target to determine whether the user and the target will impact, and transmit a signal to the dynamic padding system; wherein the spool is configured to reversibly change the filament from a first configuration to a second configuration upon receiving the input originating from the sensor; and wherein the two or more padding elements which are surrounded by the filament have a first distance between them when the filament is in the first configuration, and have a second distance between them when the filament is in the second configuration, where the second distance is less than the first distance.

Other systems, methods, features and advantages of the invention will be, or will become, apparent to one of ordinary skill in the art upon examination of the following figures and detailed description. It is intended that all such additional systems, methods, features and advantages be included within this description and this summary, be within the scope of the invention, and be protected by the following claims.

BRIEF DESCRIPTION OF THE SEVERAL VIEWS OF THE DRAWING

The invention can be better understood with reference to the following drawings and description. The components in the figures are not necessarily to scale, emphasis instead being placed upon illustrating the principles of the invention. Moreover, in the figures, like reference numerals designate corresponding parts throughout the different views.

DETAILED DESCRIPTION OF THE INVENTION

Generally, this disclosure provides an article of apparel with a padding system that dynamically changes flexibility and impact resistance. The padding system is configured to reversibly change from a high flexibility state to a high impact resistance state, and back again. The change may be triggered by a sensor that detects when an impact is imminent. This article of apparel allows a wearer to have increased range of motion when needed, but also to have increased impact protection when needed.

Figure 1:
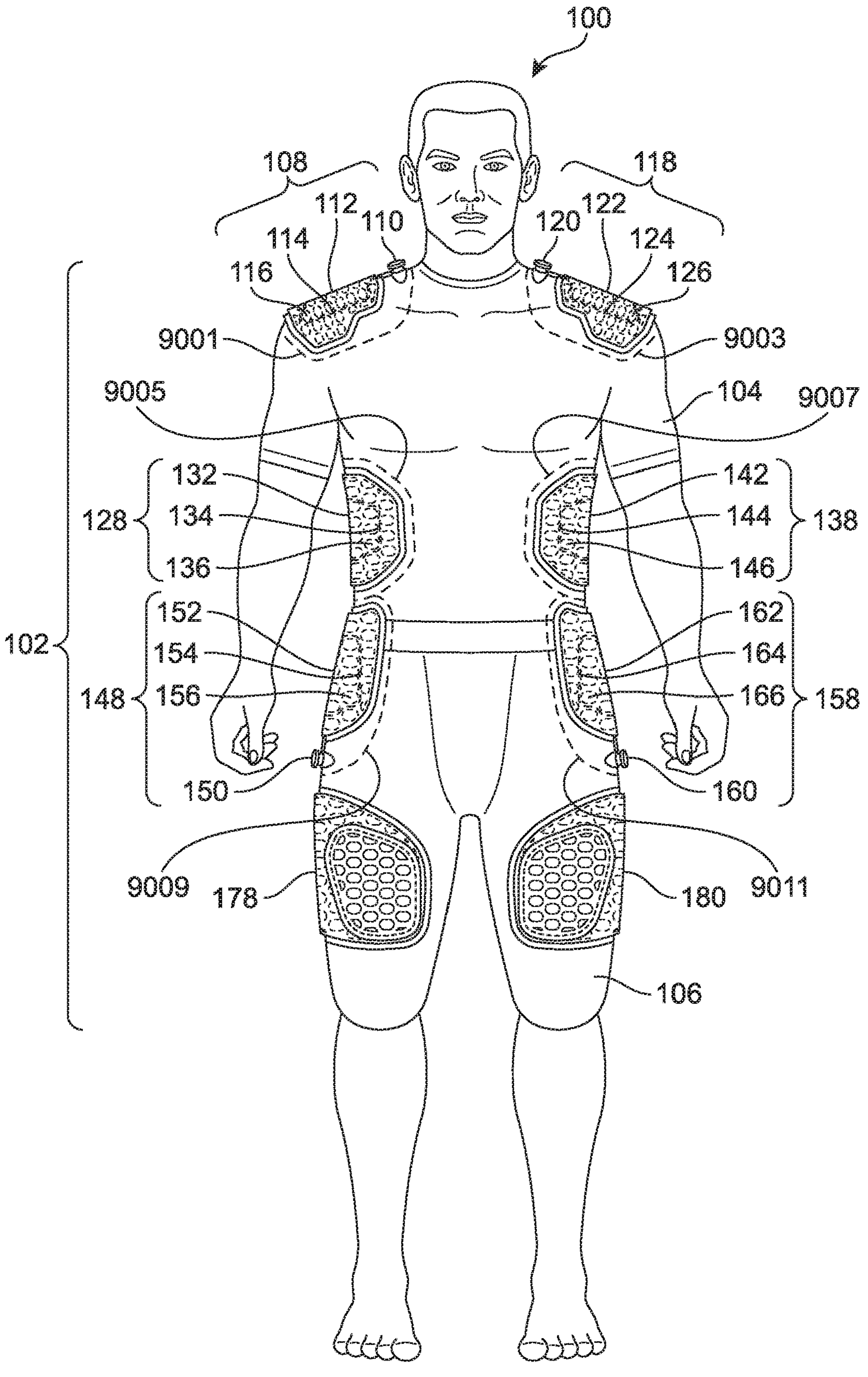
FIG. 1 is a front view of a first embodiment of an article of apparel.

FIG. 1 shows a first embodiment of first article of apparel 102. Generally, an article of apparel may include any type of clothing worn by a person 100 on any portion of the body. For example, the term "article of apparel" may include shirts, pants, shorts, undergarments, jackets, outwear, jerseys, one-piece skinsuits or jumpers, leggings, skirts, and any derivatives and combinations thereof. In the embodiment shown in FIG. 1, first article of apparel 102 refers to first shirt-type garment 104 and first pants-type garment 106 collectively. However, first shirt-type garment 104 and first pants-type garment 106 may also be referred to as individual articles of apparel.

In particular, an article of apparel in accordance with this disclosure may be a shirt-type garment or a pants-type garment. A shirt-type garment may be any article of apparel that covers the upper torso of the wearer, and may extend over at least a portion of the wearer's arms. A pants-type garment may be any article of apparel that covers the lower torso of the wearer. A pants-type garment may extend over at least a portion of the wearer's legs.

First article of apparel 102 includes multiple padding systems. Namely, first shirt-type garment 104 includes first padding system 108 and second padding system 118. Each padding system generally includes the same three major components: a pad, a spool, and a filament. As discussed throughout this disclosure, in some embodiments, each padding system may differ from other padding systems on an article of apparel. However, for simplicity's sake, in the embodiment of first article of apparel 102 the multiple padding systems generally do not substantially differ from each other except with respect to the location and shape of the pad.

Figure 2:
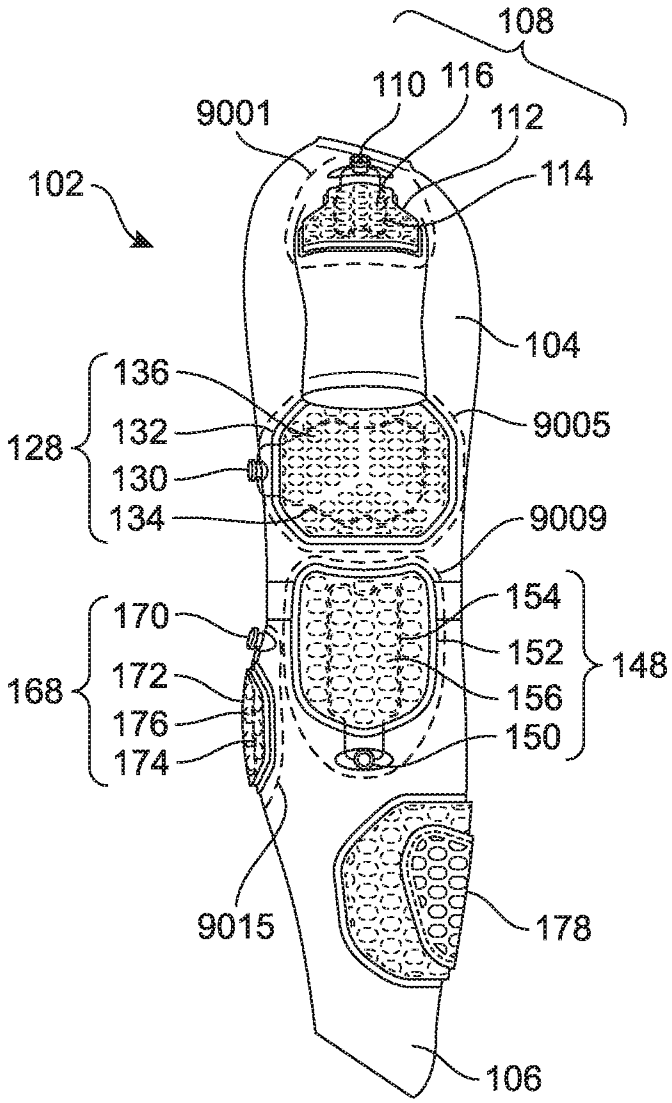
FIG. 2 is a side view of the first embodiment of an article of apparel.
Figure 3:
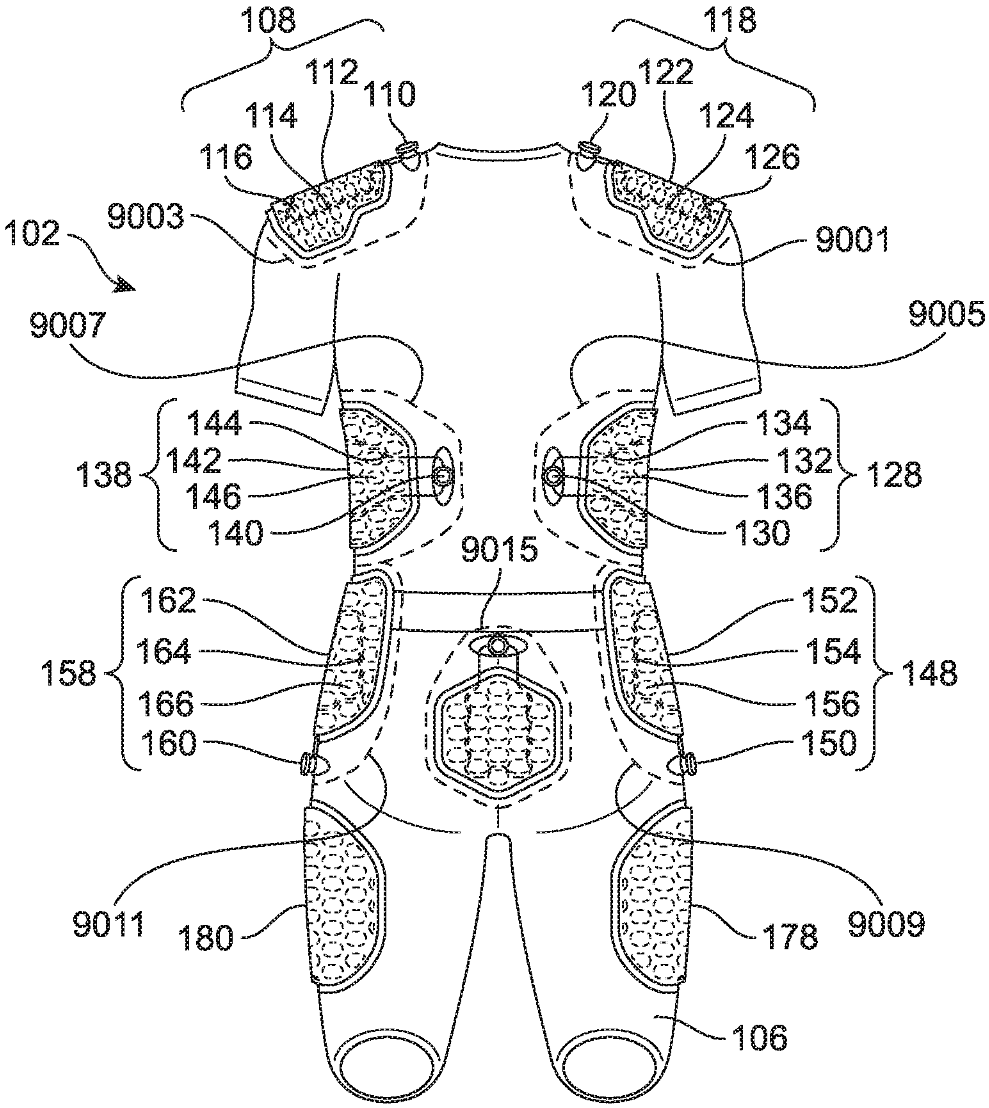
FIG. 3 is a rear view of the first embodiment of an article of apparel.

As shown variously in FIGS. 1-3, first article of apparel 102 includes seven padding systems: first padding system 108, second padding system 118, third padding system 128, fourth padding system 138, fifth padding system 148, sixth padding system 158 and seventh padding system 168. First padding system 108 is located on right shoulder area 9001 of first shirt-type garment 104, where right shoulder area 9001 of first shirt-type garment 104 corresponds to a wearer's right shoulder when worn. Second padding system 118 is located on left shoulder area 9003, where left shoulder area 9003 corresponds to a wearer's left shoulder when first shirt-type garment 104 is worn. Third padding system 128 is located on right rib area 9005, where right rib area 9005 corresponds to a wearer's right set of ribs when worn. Fourth padding system 138 is located on left rib area 9007, where left rib area 9070 corresponds to a wearer's left ribs when first shirt-type garment 104 is worn. Fifth padding system 148 is located on right hip area 9009, where right hip area corresponds to a wearer's right hip when first pants-type garment 106 is worn. Sixth padding system 158 is located on left hip area 9011, where left hip area 9011 of first pants-type garment 106 corresponds to a wearer's left hip when worn. Finally, seventh padding system 168 is located on coccyx area 9015, where coccyx area 9015 corresponds to a wearer's coccyx when first pants-type garment 106 is worn. First article of apparel 102 may also include first static padding 178 and second static padding 180.

Generally, unless noted, a padding system may be located in any area on the article of apparel. The location of a padding system may be selected based on the needs and customs of a particular sport. However, the location of a padding system in a particular location may also achieve specific advantages by addressing the flexibility needs and protective needs of that particular area of a wearer's 100 body. For example, the location of third padding system 128 and fourth padding system 138 on rib areas 9005 and 9007 may be particularly advantageous because many sports require flexibility in the core region of the body in order to bend or turn, yet the ribs are also prone to injury. Similarly, the location of fifth padding system 148 and sixth padding system 158 on hip areas 9009 and 9011 may be particularly advantageous because increased flexibility in these areas may be conducive to faster running, as is clearly required in many sports. Finally, the location of first padding system 108 and second padding system 118 on shoulder areas 9001 and 9003 may be particularly advantageous because increased flexibility in this particular region may be required to for reaching, catching, and throwing; while the shoulders are also particularly prone to collarbone injuries (among other injuries). Accordingly, the specific locations of the padding systems shown in FIGS. 1-3 may achieve particular advantages.

Each of the seven padding systems in first article of apparel 102 will briefly be discussed as shown in FIGS. 1-3, while other figures show each of the particular components in further detail as discussed variously below. First padding system 108 includes first spool 110 and first pad 112. First pad 112 then includes first plurality of padding elements 116 and first filament 114, where a first portion of first filament 114 winds through first pad 112 and a second portion of first filament 114 is at least partially wound around first spool 110.

Generally, first spool 110 may be any mechanism that is capable of rotating so as to wind first filament 114 around first spool 110. First filament 114 is connected to first spool 110 at all times, such as by being partially wound around first spool 110. First spool 110 may be configured to rotate in one direction to cause first filament 114 to be further wound around first spool 110, i.e. to shorten the length of first portion of first filament 114. First spool 110 is also configured to rotate in the opposite direction so that less of first filament 114 is wound around first spool 110, and first portion of first filament 114 is lengthened. For illustrative purposes, first spool 110 is shown in FIGS. 1-3 as raised and located in an upper shoulder portion. However, in other embodiments, any spool may be recessed or otherwise located, for example, between layers of material in the article of apparel in order to ensure that a spool does not interfere with any aspect of the athletic activity or become damaged or dirty with particles that could interfere with the winding mechanism. A spool may also be located in any general area relative to the pad, as long as the spool is located close enough to the pad that the filament can extend the distance between the spool and the pad, and provide sufficient tension to alter the stiffness properties of the pad. The structure of the spool is further discussed below with respect to additional figures.

First filament 114 may generally be any elongated string or wire that is sufficiently flexible as to fit the contours of first plurality of padding elements 116 while also having a sufficiently high tensile strength that first filament 114 can apply force to first plurality of padding elements 116 and resist an impact force without breaking. First filament 114 may generally be made from any natural or synthetic material. For example, first filament 114 may be made from a variety of polymers, metals, natural fibers such as cotton or wool, Kevlar, silk, and others. First filament 114 may be fibrous, consisting of smaller strands or yarns twisted together, or be of a monofilament with uniform cross-section. The structure of the filament is further discussed below with respect to additional figures.

First plurality of padding elements 116 may generally be any structures within first pad 112 that will absorb and attenuate and/or dissipate a force, such as a force from an impact. For example, padding elements may be compressible, such that the energy of an impact force will be absorbed by the compression of one or more padding elements. In particular, each padding element may extend vertically upwards and be vertically compressible. Each padding element may be made from a variety of compressible materials, such as polymer foam, open-celled foam, closed-cell foam, rubber, felt, and other materials.

First plurality of padding elements 116 may generally be arranged in a repeating pattern at some distance away from each other. A repeating pattern may include first plurality of padding elements 116 being each equally spaced from each other, or may be spaced apart from each other according to a mathematical formula. In this way, first pad 112 may be flexible because each padding element of first plurality of padding elements 116 may move independently from any other padding element of first plurality of padding elements 116. The structure of each padding element in each plurality of padding elements is further discussed below with respect to additional figures.

First padding system 108 is therefore comprised of three main components: first pad 112 (with plurality of padding elements 116), first filament 114, and first spool 110. Each of the other padding systems on first article of apparel 102 may be comprised of equivalent components. In particular, first shirt-type garment 104 further comprises a second padding system 118. Second padding system 118 includes second spool 120, second pad 122 (with second plurality of padding elements 126), and second filament 124. Because second padding system 118 is located on shoulder area 9003, second padding system 118 may be substantially similar to padding system 108 that is located on shoulder area 9001.

First shirt-type garment 104 may also include third padding system 128 and fourth padding system 138. Third padding system 128 includes third spool 130 (as shown in FIGS. 2 and 3), third pad 132 (with third plurality of padding elements 136), and third filament 134. Fourth padding system 138 includes fourth spool 140 (as shown in FIG. 3), fourth pad 142 (with fourth plurality of padding elements 146), and fourth filament 144. Third padding system 128 and fourth padding system 138 are located on rib areas 9005 and 9007 respectively, and therefore pad third 132 and pad fourth 142 may differ in shape from pad first 112, but the padding systems may otherwise be functionally similar. Specifically, each of the first padding system 108, second padding system 118, third padding system 128, and fourth padding system 138 are designed to dynamically change stiffness, but the shape of each pad may be configured to suit a particular region of a wearer's 100 body in order to best protect that region of the body.

As shown in FIGS. 1-3, first article of apparel 102 may also be inclusive of first pants-type garment 106. First pants-type garment 106 may include fifth padding system 148 and sixth padding system 158, located on hip areas 9009 and 9011 respectively. Fifth padding system 148 may include fifth spool 150, fifth pad 152 (with fifth plurality of padding elements 156), and fifth filament 154. Sixth padding system 158 may include sixth spool 160, sixth pad 162 (with sixth plurality of padding elements 166), and sixth filament 164. Fifth padding system 148 and sixth padding system 158 may differ from first padding system 108 with respect to the shape of fifth pad 152 and sixth pad 162, due to the location on hip areas 9009 and 9011 instead of shoulder area 9001. However, fifth padding system 148 and sixth padding system 158 may otherwise be functionally similar to first padding system 108.

Figure 4A:
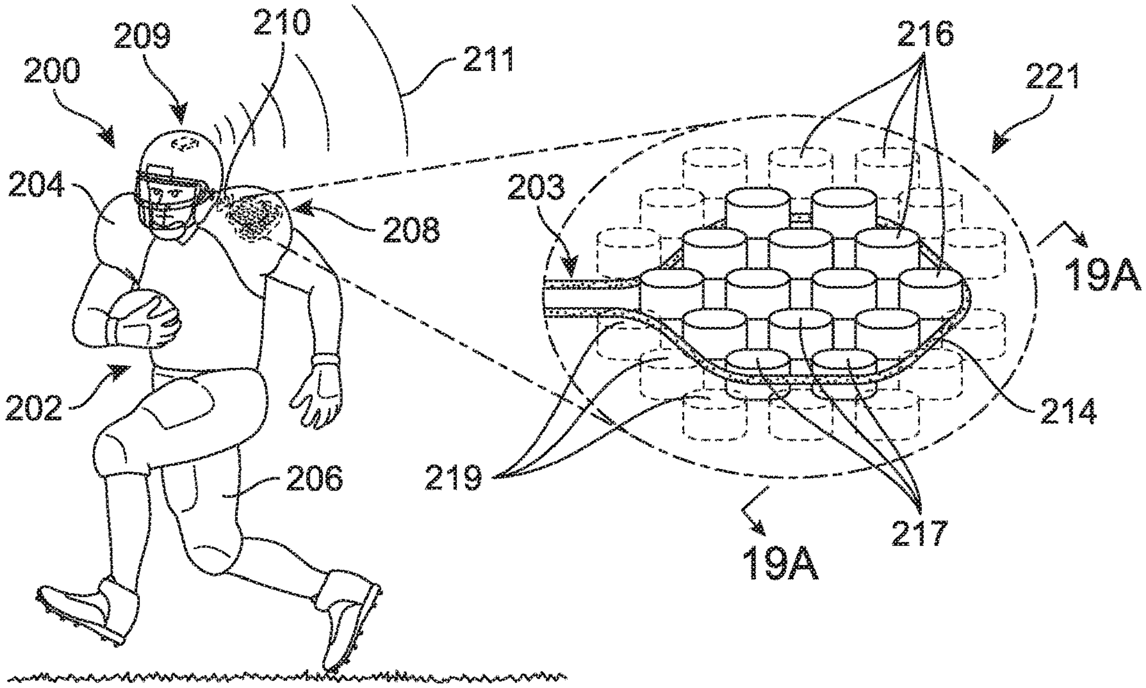
FIG. 4A shows an article of apparel in its first configuration prior to an impending impact.
Figure 4B:
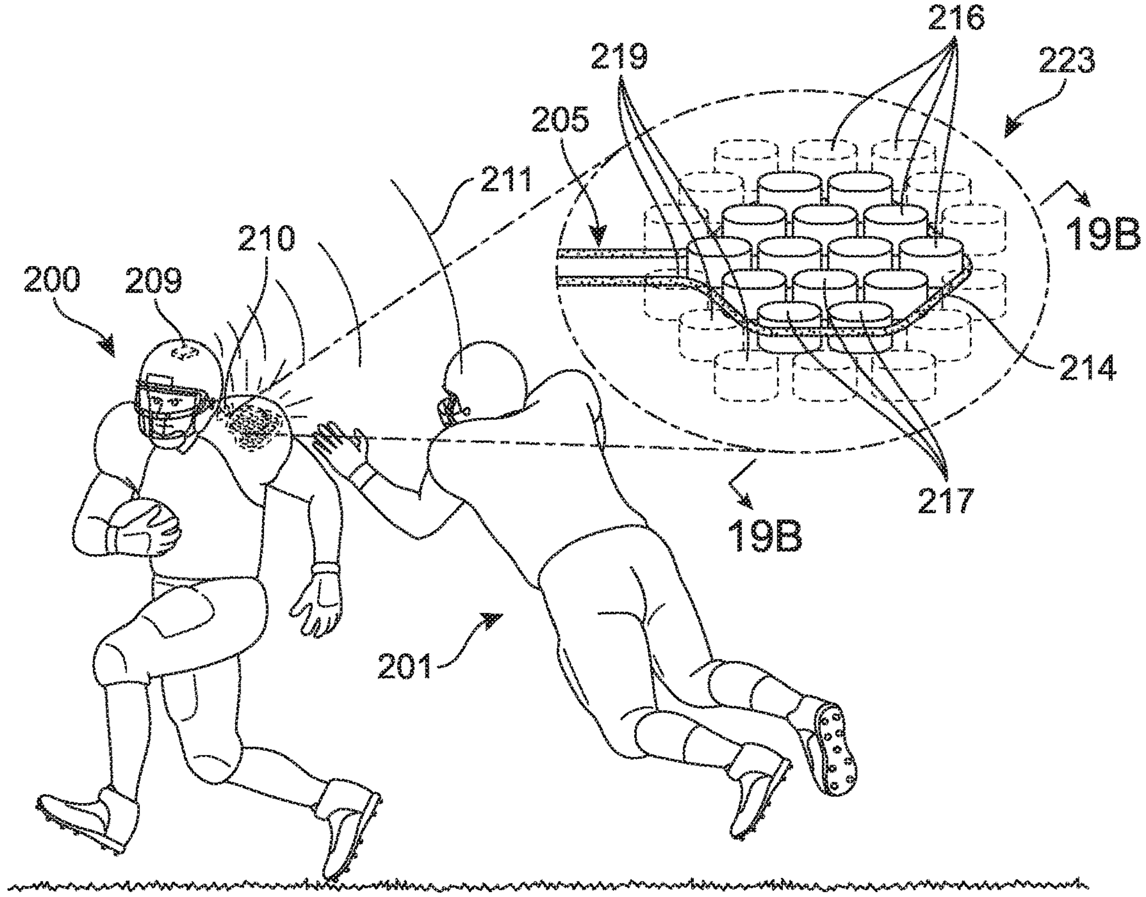
FIG. 4B shows the article of apparel of FIG. 4A in its second configuration as an impact is about to occur.
Figure 5A:
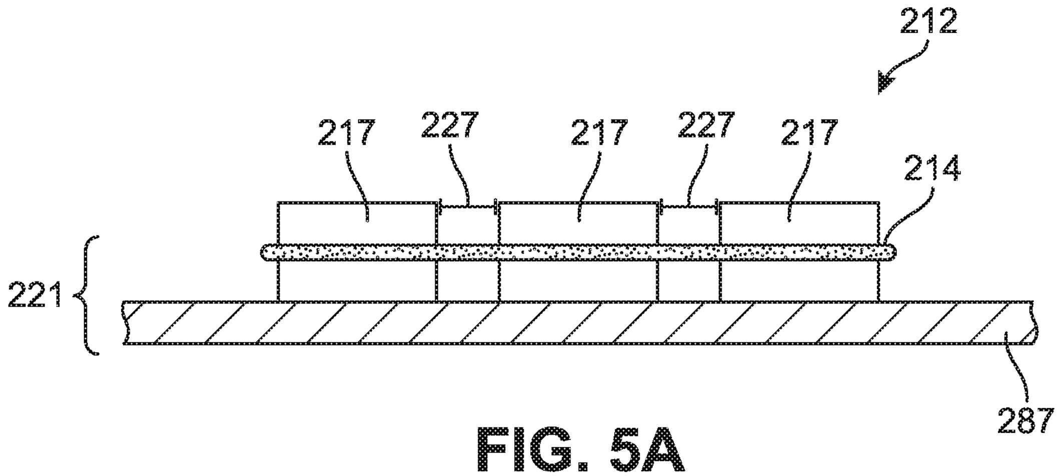
FIG. 5A-C show a cross-sectional view of the padding system of FIG. 4A and FIG. 4B, and various embodiments thereof.
Figure 5B:
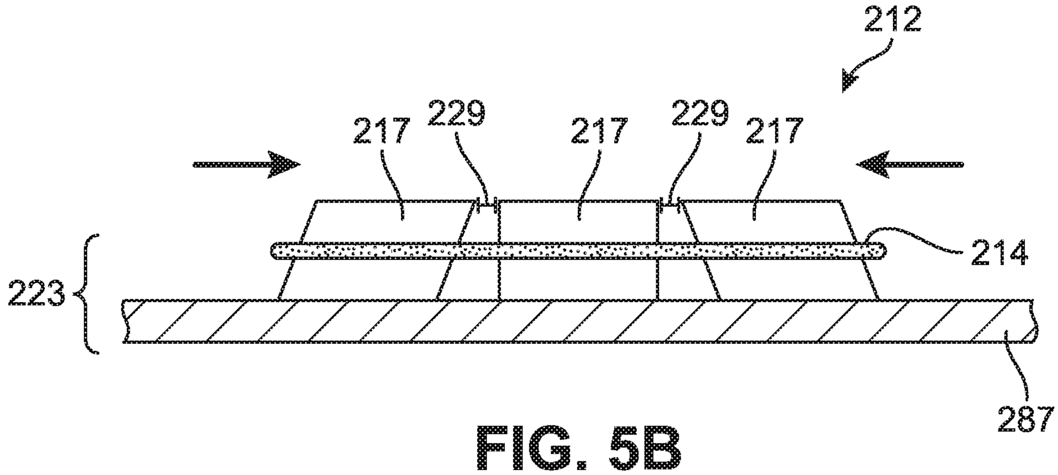
Figure 5C:
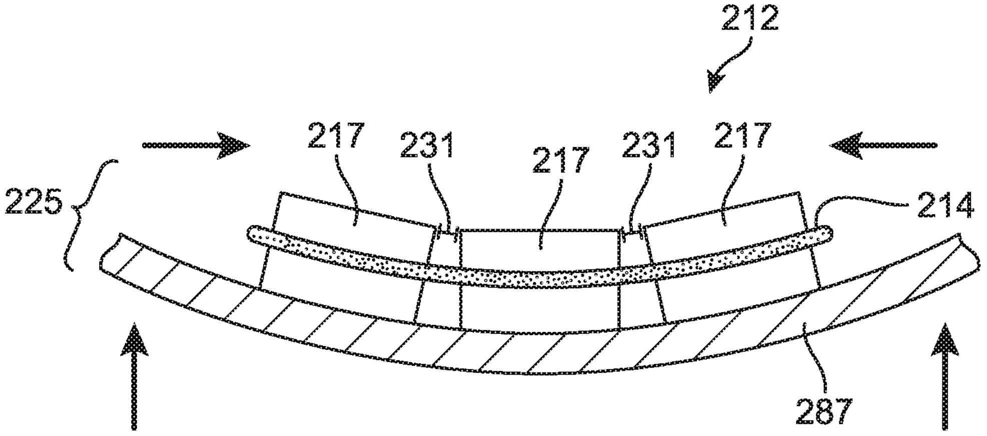

FIG. 4A and FIG. 4B show further details of how a padding system in accordance with this disclosure may be configured and operate. FIG. 5A, FIG. 5B, and FIG. 5C also show additional details of the embodiment in FIG. 4A and FIG. 4B.

In FIG. 4A, a football player 200 is wearing a second article of apparel 202 that may be substantially similar to first article of apparel 102 (shown in FIGS. 1-3). Specifically, second pants-type garment 206 may be substantially similar to first pants-type garment 106 (shown in FIGS. 1-3), and second shirt-type garment 204 may be substantially similar to first shirt-type garment 104 (shown in FIGS. 1-3). In particular, second shirt-type garment 204 includes eighth padding system 208. Eighth padding system 208 may be substantially similar to first padding system 108.

As shown in FIG. 4A, football player 200 may be engaged in the activity of running with a football during a game of American football. While running with the football, player 200 seeks to avoid being tackled by other players in order to advance the position of the football on the field of scrimmage. Accordingly, player 200 may prefer to have increased flexibility in order to achieve increased running speed. Therefore, at this time, eighth padding system 208 may be in first configuration 221. Generally, first configuration 221 may correspond to a default configuration that is associated with increased flexibility and decreased impact protection. In other words, eighth pad 212 in first configuration 221 may have a first stiffness value. As is generally known, the stiffness of an article is the extent to which it resists deformation in response to an applied force. Stiffness may be determined in accordance with a variety of known standards, as may be known to a person having ordinary skill in the art. The stiffness discussed here refers to the stiffness of the pad as a whole.

The callout of FIG. 4A shows a detailed view of eighth plurality of padding elements 216 in first configuration 221. Out of eighth plurality of padding elements 216, a subset of a plurality of padding elements 217 may be surrounded by filament 214. Other padding elements 219 out of eighth plurality of padding elements 216 may remain that are not surrounded by filament 214. Eighth plurality of padding elements 216 may be mounted on second base layer 287, as shown in further detail in FIGS. 5A-C. Second base layer 287 may be a flexible layer made from a variety of known materials such as textiles, woven or nonwoven, or flexible polymer sheets. Generally, second base layer 287 should be sufficiently flexible as to bend in response to minimal forces caused by movement of wearer 200 through wearer's 200 normal range of motion when engaging in the sporting activity for which second article of apparel 202 is configured. That is, second base layer 287 should be flexible enough so as to not impede any range of motion as compared to when wearer 200 is not wearing any article of apparel having the padding system.

When in first configuration 221, padding elements 217 may be a first distance 227 from each other as shown in FIG. 5A. First configuration 221 may be referred to as a relaxed state, where each of padding elements 217 may move independently from each other of padding elements 217. Eighth pad 212 may therefore have increased flexibility, allowing wearer 200 to have a full range of motion. The first stiffness value associated with first configuration 221 may therefore be relatively low. In accordance with aspects herein, the terms "configuration" and "state" may be used interchangeably. For example, the first configuration 221 may refer to a "first state" having a first stiffness.

Wearer 200 may also be wearing first sensor 209 that may emit first sensor field 211. First sensor 209 may be mounted on wearer 200, as shown, or may be mounted on second article of apparel 202 so as to be considered a part of second article of apparel 202. First sensor 209 is configured to be capable of determining when an impact between wearer 200 and another person (or object) is about to take place. Specifically, for example, first sensor 209 may be a proximity sensor. A variety of proximity sensors are known in the art, which generally are configured to emit first sensor field 211 in the electromagnetic spectrum and then send a signal as output when first sensor field 211 is disturbed by an object in close physical proximity. Details regarding various types of proximity sensors, and which particular part of the electromagnetic spectrum used for first sensor field 211, may be known to persons having ordinary skill in the art of electrical engineering and microelectronics.

As shown in FIG. 4B, when first sensor field 211 is interrupted by second football player 201 this may trigger eighth padding system 208 to enter second configuration 223. Specifically, first sensor 209 may determine whether an impact between wearer 200 and second football player 201 is imminent. If so, first sensor 209 may trigger eighth padding system 208 to change from first configuration 221 to second configuration 223 in order to provide wearer 200 with increased impact protection. First sensor 209 may be configured such that this change from first configuration 221 to second configuration 223 takes place at some small interval of time prior to an anticipated impact, such as 0.1 seconds, or 0.01 seconds. The response times of a variety of proximity sensors are known in the art.

The change from first configuration 221 to second configuration 223 may be accomplished by using eighth filament 214 to tighten padding elements 217 together. Specifically, when eighth padding system 208 is in first configuration 221, eighth filament 214 may have first length 203 within eighth pad 212. Generally, the length of eighth filament 214 may be controlled by eighth spool 210. Namely, eighth spool 210 may unwind by rotating in one direction to allow a longer length of eighth filament 214 to extend into eighth pad 212 so that eighth filament 214 has first length 203. First length 203 refers to the length of the filament within the pad, apart from a length of filament that may be coiled on eighth spool 210 and apart from a length of filament that is outside the pad but nonetheless not coiled on eighth spool 210. The total length of eighth filament 214 does not substantially change from the first configuration to the second configuration, only the length of eighth filament 214 that is coiled on eighth spool 210 and the length of eighth filament 214 that is extending through eighth pad 212. Eighth spool 210 and eighth filament 214 may remain in first configuration 221, so that eighth filament 214 has first length 203, until receiving an input from first sensor 209.

Upon receiving an input from first sensor 209, eighth spool 210 may wind filament 214 by rotating. Eighth filament 214 then achieves second length 205 in eighth pad 212. Second length 205 may be shorter than first length 203. As a result of this decrease in length, padding elements 217 may be pushed together horizontally by eighth filament 214. Whereas padding elements 217 had first distance 227 between them when padding system 208 was in first configuration 221, padding elements 217 have second distance 229 between them when eighth padding system 208 is in second configuration 223. Second distance 229 may be less than first distance 227. The horizontal movement/deformation may be relative to a plane of second base layer 287. This is shown in FIG. 5.

Specifically, FIG. 5B shows one embodiment of how this may happen: padding elements 217 may be elastically deformed in a horizontal direction towards each other in respond to a force applied by eighth filament 214 when eighth filament 214 has a shorter length (second length 205). FIG. 5C shows an alternative embodiment of second configuration 225: second base layer 287 may bend upwards (vertical relative to the plane of first base layer 287) in order to allow padding elements 217 to have distance 231 between them. The bending of second base layer 287 in configuration 225 may be an elastic deformation, such that second base layer 287 can return to its originally configuration when eighth filament 214 is unwound such that eighth filament 214 returns to first length 203.

As a result of the decreased distance 229 (or 231) between padding elements 217 when eighth padding system 208 is in second configuration 223, the overall stiffness of eighth pad 212 may be increased. Specifically, padding elements 217 may no longer be free to move independently from each other padding element 217 in response to an impact force. Therefore, more of the impact force may be expended compressing the padding elements 217. Eighth pad 212 in second configuration 223 may therefore have a second stiffness value, where the second stiffness value is greater than the first stiffness value associated with first configuration 221. As a result of this difference in stiffness, less of an impact force may be transmitted to the wearer's 200 body when eighth pad 212 is in second configuration 223 as compared to an impact that occurs when eighth pad 212 was in first configuration 221.

Generally, second distance 229 (or 231) may be any distance that is less than first distance 227. In some embodiments, second distance 229 or 231 may be about 50% of first distance 227. In other embodiments, second distance 229 or 231 may be about 10% of first distance 227. In yet other embodiments, second distance 229 or 231 may be substantially zero. In embodiments were second distance 229 or 231 is substantially zero, at least a portion of adjacent padding elements 217 may be contiguous with each other. Generally, a smaller second distance 229/231 will result in a greater second stiffness of padding system 208 in second configuration 223. That is, the value of the second stiffness of second configuration 223 is inversely proportional to the size of distance 229/231.

The change from first configuration 221 to second configuration 223 (or 225) may preferably be reversible. Any deformation of padding elements 217 or second base layer 287 may be fully elastic. Once eighth padding system 208 has changed to second configuration 223, eighth spool 210 may ensure that eighth filament 214 remains at second length 205 until the impact occurs. Then, eighth padding system 208 may be configured to reset eighth filament 214 back to first length 203 by winding eighth spool 210 in an opposite direction as the winding that changed filament 214 from length 203 to length 205. This reset may be triggered by first sensor 209, such as by another interaction with first sensor field 211, or after a predetermined period of time. In embodiments where the reset occurs after a predetermined time, first sensor 209 may also include a timing mechanism as part of microprocessor controls (not shown) contained within first sensor 209.

Figure 6:
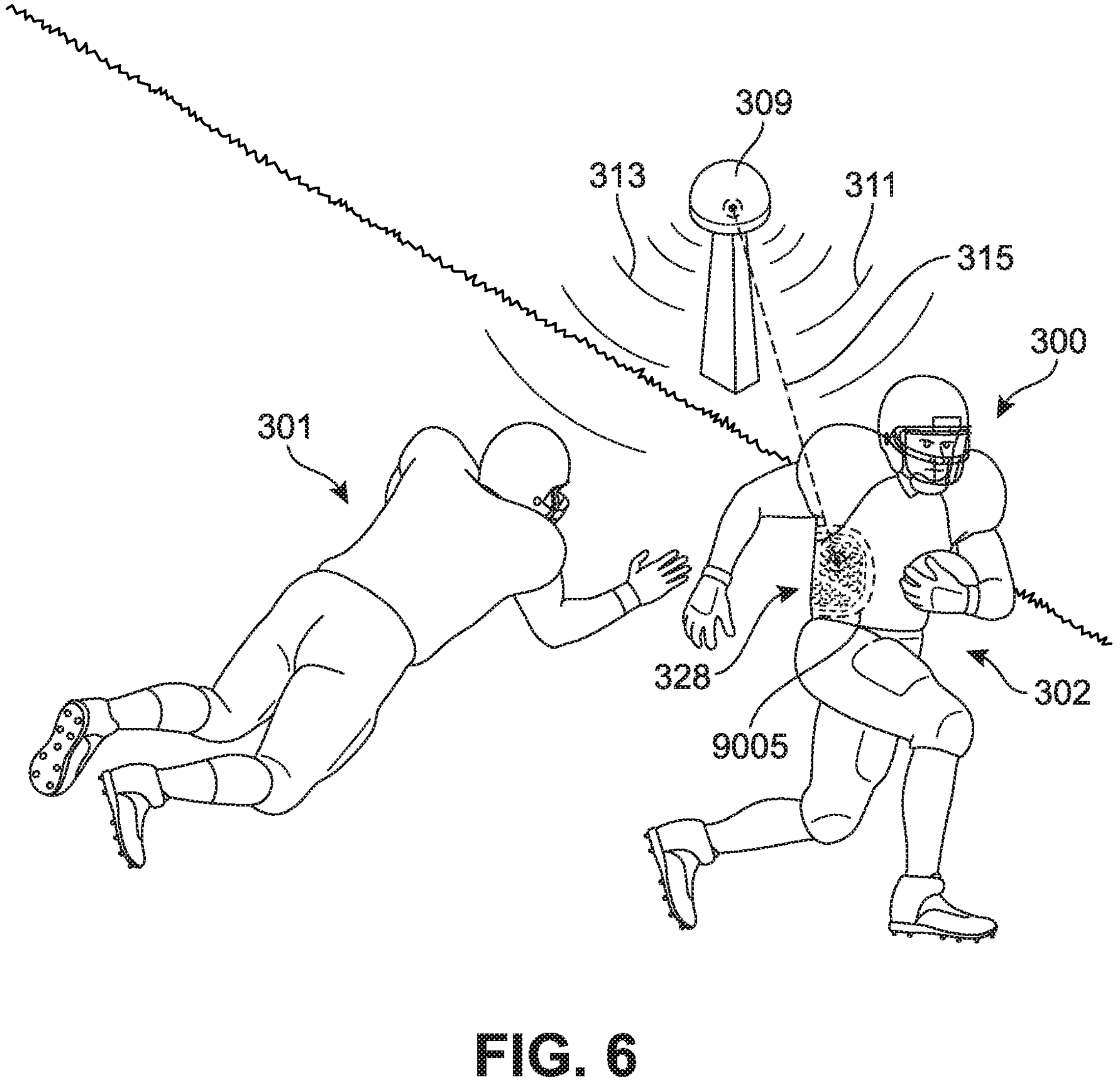
FIG. 6 shows an article of apparel receiving a wireless signal from a sensor that is located some distance from the wearer of the article of apparel.

FIG. 6 shows second sensor 309, which is an alternative embodiment of first sensor 209. In the particular embodiment shown in FIG. 6, second sensor 309 may be located some distance from wearer 300. For example, second sensor 309 may be located on a sideline that is off of a field of play. Second sensor 309 may emit one or more sensor fields, such as second sensor field 311 and third sensor field 313 (second sensor field 311 being the first of two sensor fields within the embodiment of FIG. 6, and third sensor field 313 being the second of two sensor fields within the embodiment of FIG. 6), which enable the sensor to obtain relevant information about wearer 300 and a target such as other player 301. In particular, second sensor 309 may be configured to sense the position and velocity of wearer 300 as well as the position and velocity of other player 301. Second sensor 309 may then be configured to compare this information, such as through the use of a general purpose computer including microprocessor controls, to determine whether an impact will take place between wearer 300 and target 301. If such an impact is anticipated to occur, second sensor 309 may transmit wireless signal 315 to third padding system 328 in order to cause third padding system 328 to change from a first configuration to a second configuration.

In the embodiment shown in FIG. 6, only third padding system 328 is shown for illustrative purposes. However, third article of apparel 302 may include multiple padding systems, for example as in the embodiment of an article of apparel shown in FIGS. 1-3. In such embodiments, second sensor 309 may be configured to transmit wireless signal 315 to one specific padding system, based on the location of the impending impact between wearer 300 and target 301. For example, in one embodiment, second sensor 309 may send wireless signal 315 to a padding system located specifically on the right side of third article of apparel 302 or on the left side of third article of apparel 302. In another embodiment, second sensor 309 may send wireless signal 315 specifically to a padding system located on a hip area. In the particular embodiment shown in FIG. 6, second sensor 309 may send wireless signal 315 specifically to a padding system located on a right rib area 9005 of third article of apparel 302 that corresponds to a right set of ribs of wearer 300 when article of apparel 302 is worn.

Figure 7:
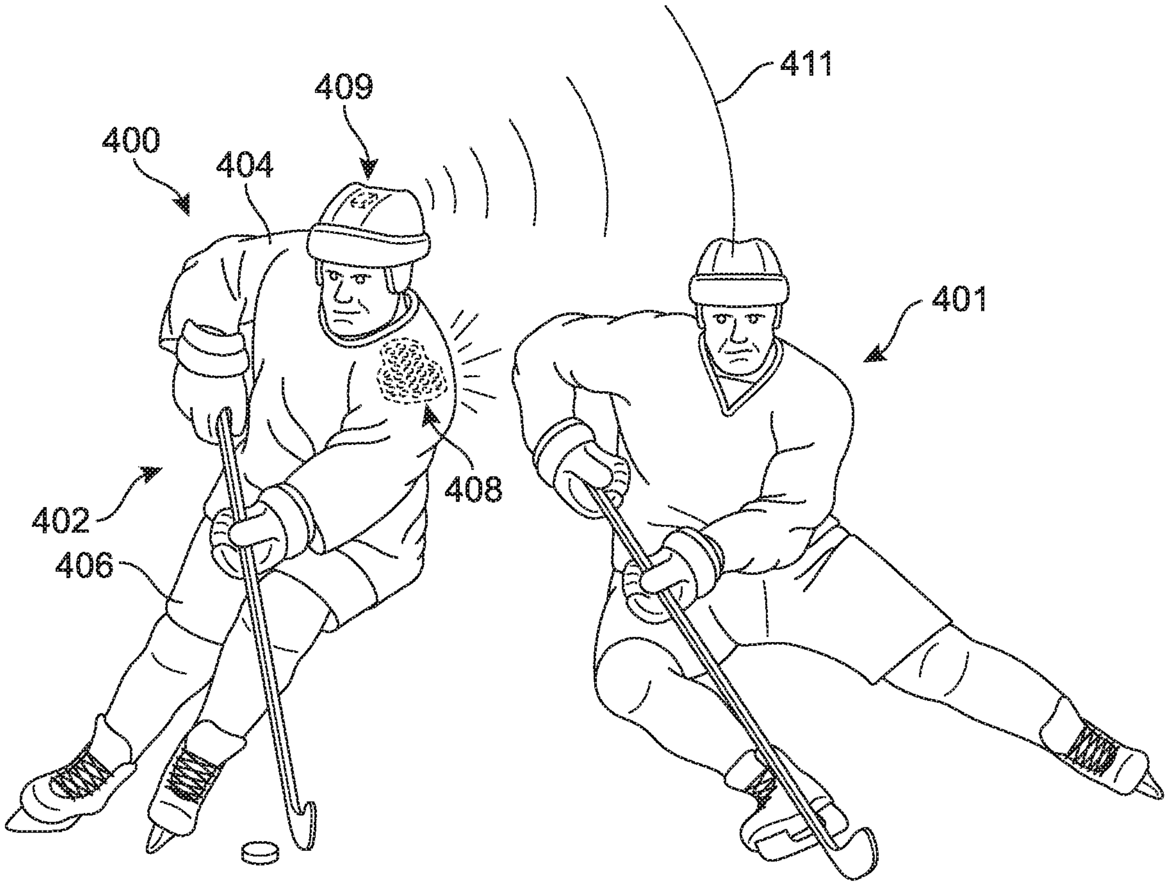
FIG. 7 shows an embodiment of an article of apparel being used in a game of hockey.
Figure 8:
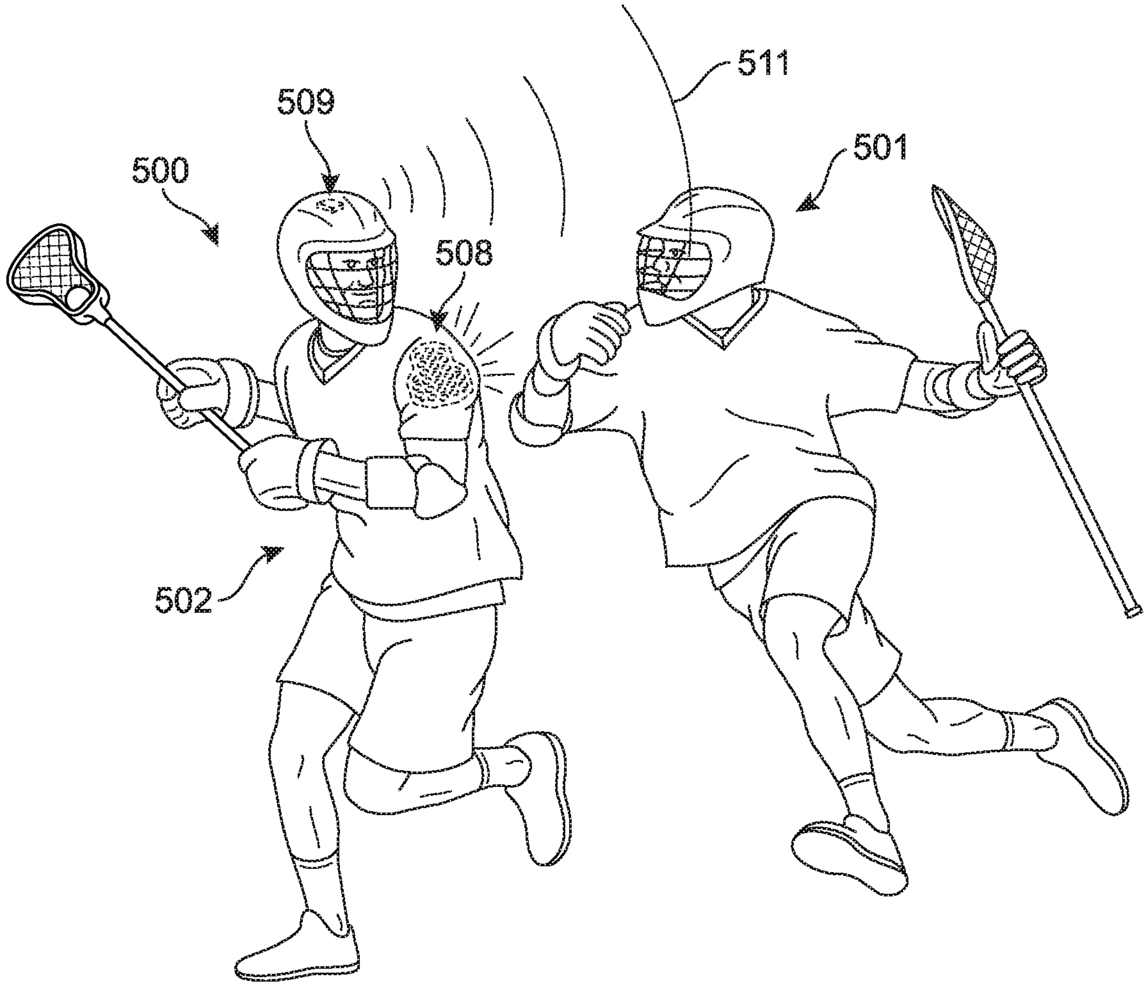
FIG. 8 shows an embodiment of an article of apparel being used in a game of lacrosse.
Figure 9:
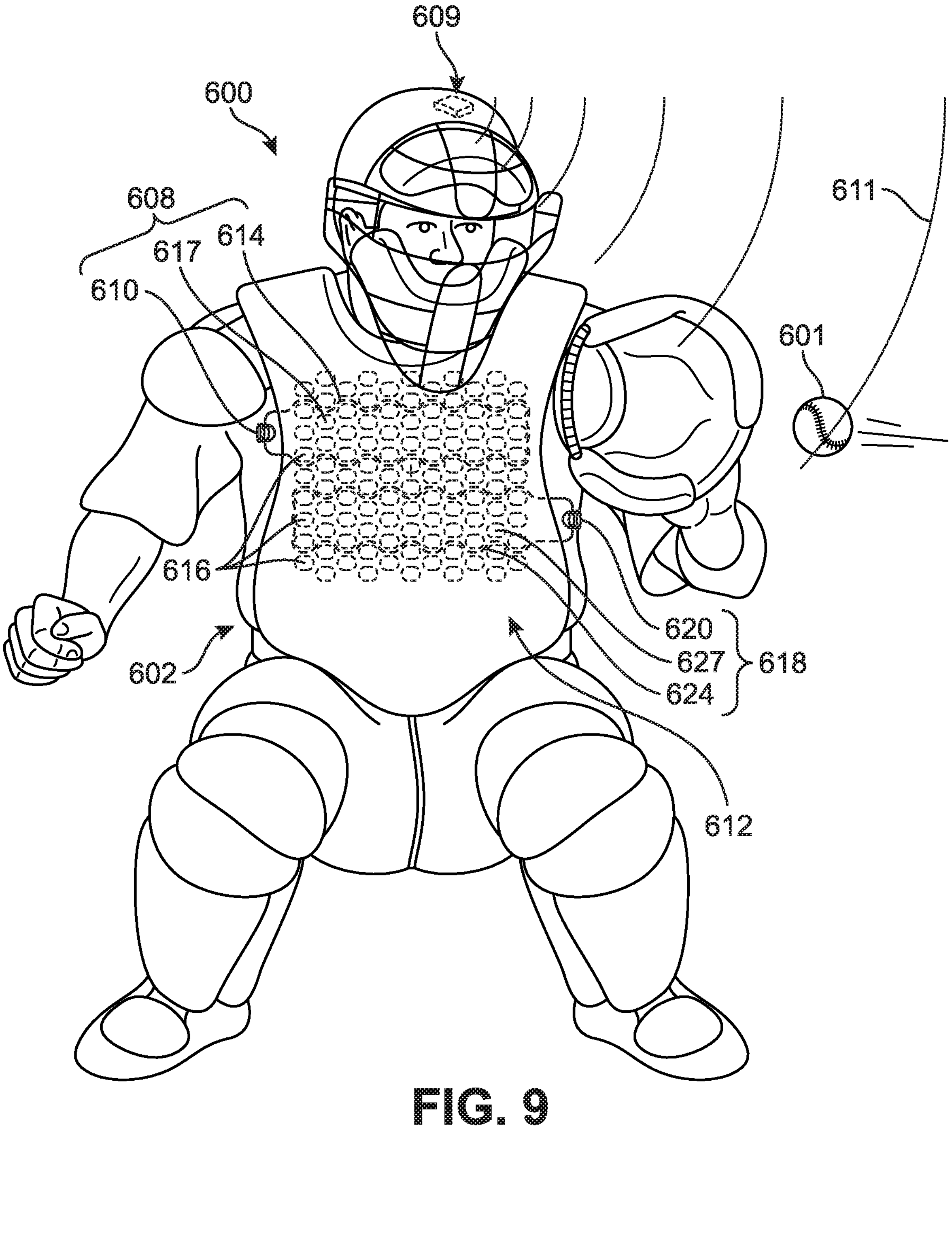
FIG. 9 shows an embodiment of an article of apparel being used in a game of baseball.

Generally, an article of apparel in accordance with this disclosure may be used in a variety of sports. FIGS. 7-9 show various embodiments of several articles of apparel in use in different sports.

FIG. 7 shows fourth article of apparel 402 in use in a game of hockey. Wearer 400 uses fourth article of apparel 402, which includes third shirt-type garment 404 and third pants-type garment 406. Third shirt-type garment 404 includes ninth padding system 408. Third sensor 409 emits fourth sensor field 411 that detects an impending impact from other player 401. Generally, each of these components may be in accordance with the discussion above detailing the components in other embodiments of an article of apparel. However, third shirt-type garment 404 and third pants-type garment 406 may both be particularly configured for use in hockey, and may comply with all requirements and rules for hockey equipment as may be instituted by one or more of the sport's governing bodies.

FIG. 8 shows fifth article of apparel 502 as worn by wearer 500 playing a game of lacrosse. Fifth article of apparel 502 includes tenth padding system 508. Tenth padding system 508 may be triggered by fourth sensor 509 when fifth sensor field 511 interacts with other lacrosse player 501. Fifth article of apparel 502 and its components may be substantially similar as in other embodiments discussed above. However, fifth article of apparel 502 may also be particularly suited for the game of lacrosse, and may comply with all requirements and rules for lacrosse equipment as may be instituted by one or more of the sport's governing bodies.

FIG. 9 shows sixth article of apparel 602 as worn by wearer 600, who is a baseball catcher. Unlike other embodiments discussed above, but similar to the embodiment of FIG. 13 discussed below, sixth padding system 602 may include two padding systems. Specifically, sixth padding system may include both eleventh padding system 608 and twelfth padding system 618 on a single pad, ninth pad 612. Eleventh padding system 608 is the first of two padding systems in sixth padding system 602, and twelfth padding system 618 is the second of two padding systems in sixth padding system 602.

As shown in FIG. 9, eleventh padding system 608 and twelfth padding system 618 may encompass separate groups of padding elements within the total of ninth plurality of padding elements 616 on pad 612. Specifically, ninth filament 614 encompasses plurality of padding elements 617. On the other hand, twelfth padding system 618 encompasses plurality of padding elements 627 within tenth filament 624. In eleventh padding system 608, ninth filament 614 is connected to ninth spool 610. In twelfth padding system 618, tenth filament 624 is connected to tenth spool 620. This particular embodiment of sixth article of apparel 602, which includes two padding systems within one pad (ninth pad 612), may be configured such that fifth sensor 609 may selectively trigger only one (or both) padding systems depending on the location of an impending impact with target baseball 601. This embodiment of sixth article of apparel 602 may therefore retain flexibility in one area of ninth pad 612, while also providing impact resistance in another area of ninth pad 612.

Figure 10:
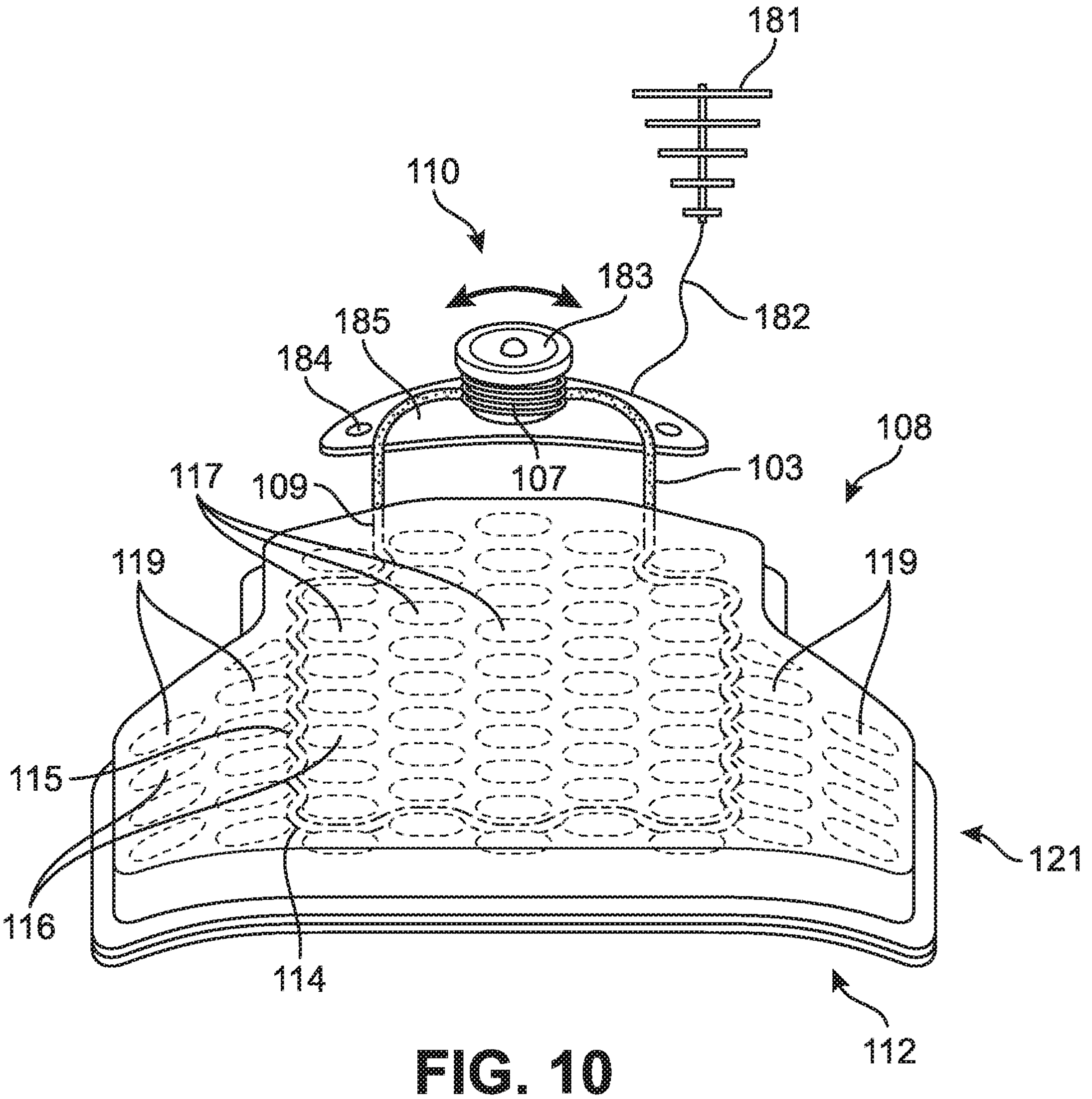
FIG. 10 shows a close-up view of an embodiment of a padding system.
Figure 11:
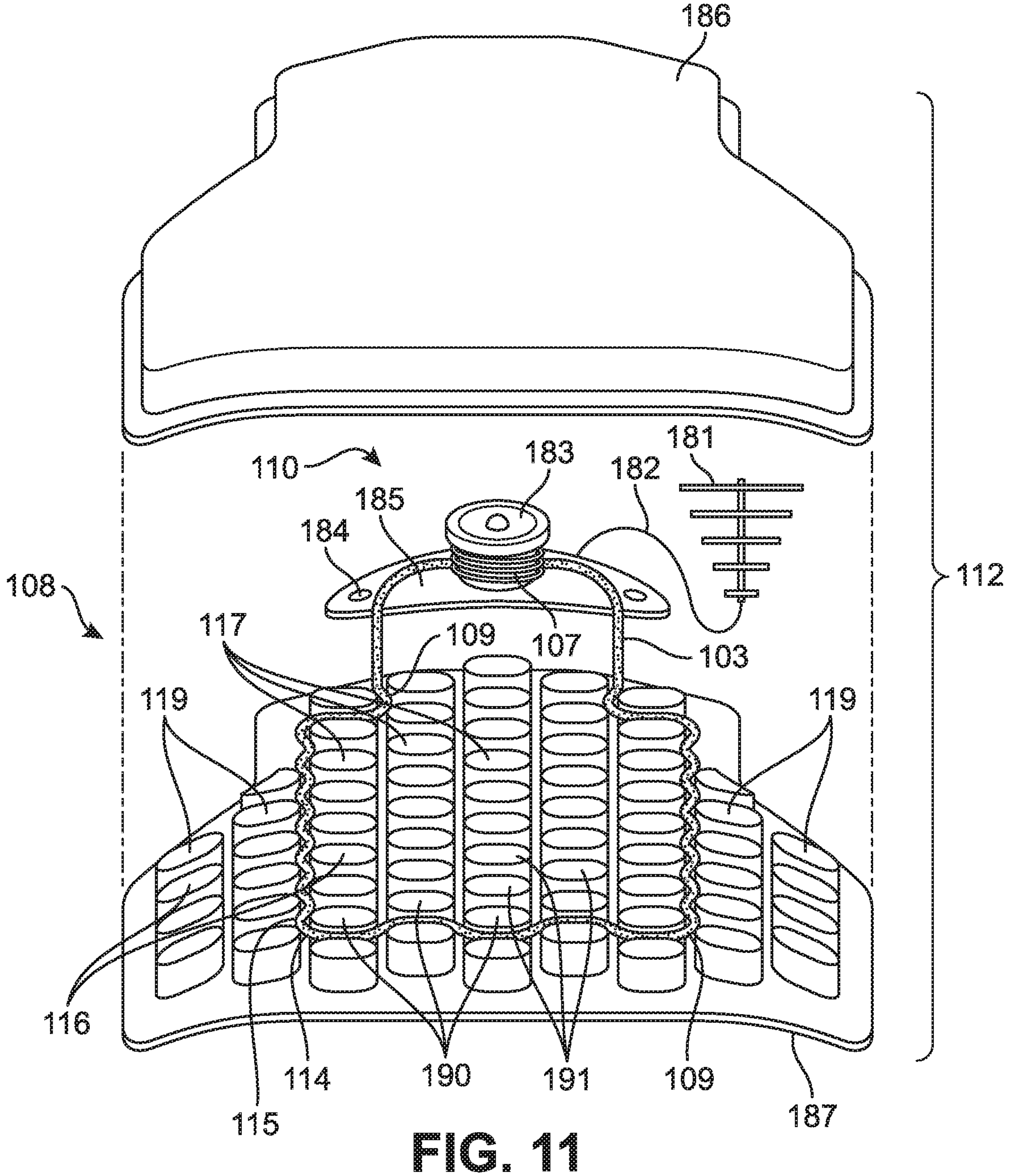
FIG. 11 shows an exploded view of the padding system of FIG. 9.

FIGS. 10 and 11 show further details of first padding system 108 from the embodiment shown in FIGS. 1-3 as discussed above. In FIG. 10, first pad 112 may include first plurality of padding elements 116. Some of first plurality of padding elements 116 may be categorized as being surrounded by first filament 114, these particular padding elements are designated as padding elements 117. The remainder of first plurality of padding elements 116 that are not surrounded by first filament 114 are designated as padding elements 119. In FIG. 10, first padding system 108 is shown in first configuration 121, wherein first filament 114 may be loose around padding elements 117 and does not compress any of padding elements 117 together to any significant degree. In first configuration 121 as shown in FIGS. 10 and 11, first filament 114 may have first length 103 that is apart from spool 110.

FIG. 11 also shows further detail of first spool 110 and how first filament 114 may be connected to first spool 110. First spool 110 may be considered as being inclusive of the structures: first cylinder 183, first mounting plate 185, and first attachment 184 as shown in FIG. 11. First filament 114 may be at least partially wound around first cylinder 183. First cylinder 183 may be configured to rotate as noted in FIG. 10 to wind and unwind first filament 114. First cylinder 183 may include features (not shown) in order achieve this end, such as: an actuator motor to rotate first cylinder 183, a power source for the motor such as a lithium ion rechargeable battery; and a latch mechanism that may reversibly hold first cylinder 183 in a specific position after it rotates. First mounting plate 185 and first attachment 184 may generally be any system for attaching first spool 110 to a remainder of first article of apparel 102.

Next, first filament 114 may include first filament portion 107 that is wound around cylinder 183 when first padding system 108 is in first configuration 121. First filament 114 then also includes second filament portion 109 that extends through first pad 112 when first padding system 108 is in first configuration 121. First filament 114 may also be described as being arranged in first pad 112 in first filament pattern 115. A filament pattern may be described as the arrangement a filament makes as it winds around and between any associate padding elements. In the embodiment of FIG. 10, first filament pattern 115 encompasses a majority of plurality of padding elements 116, and first filament pattern 115 may have a generally square shape. However, other patterns of the filament may be used in other embodiments as discussed below.

First padding system 108 also includes first antenna 181. First antenna 181 may be any known antenna that is configured to receive a signal from a sensor, such as first sensor 209 or second sensor 309. First padding system 108 may include first antenna 181 even in embodiments (such as second article of apparel 202 discussed above) where a sensor (such as first sensor 209) is mounted on wearer 200, in order to avoid the need for wires and reduce bulkiness and weight of the article of apparel. First antenna 181 may be connected to first spool 110 by first wire 182. Generally, first article of apparel 102 may include some input source for first spool 110 that triggers the spool to change the filament length from a first length to a second length. In the embodiment shown in FIG. 9, first antenna 181 may be considered to be the input source.

FIG. 11 shows an exploded view of first padding system 108, from the same perspective as FIG. 10. In particular, FIG. 11 shows how first pad 112 may be comprised of first pad cover 186, first plurality of padding elements 116, and first base layer 187. First pad cover 186 may generally be any structure that covers the remainder of first pad 112, in order to retain first filament 114 in its predetermined first filament pattern 115. However, first pad cover 186 may also be reversibly detachable in some embodiments. A reversibly detachable first pad cover 186 may allowed first filament pattern 115 of first filament 114 to be customized by a user to a desired arrangement, prior to a use of the article of apparel 102 incorporating first padding system 108. First pad cover 186 may generally be sufficiently flexible so that first pad 112 will not inhibit a wearer's range of motion when in first configuration 121.

Figure 12:
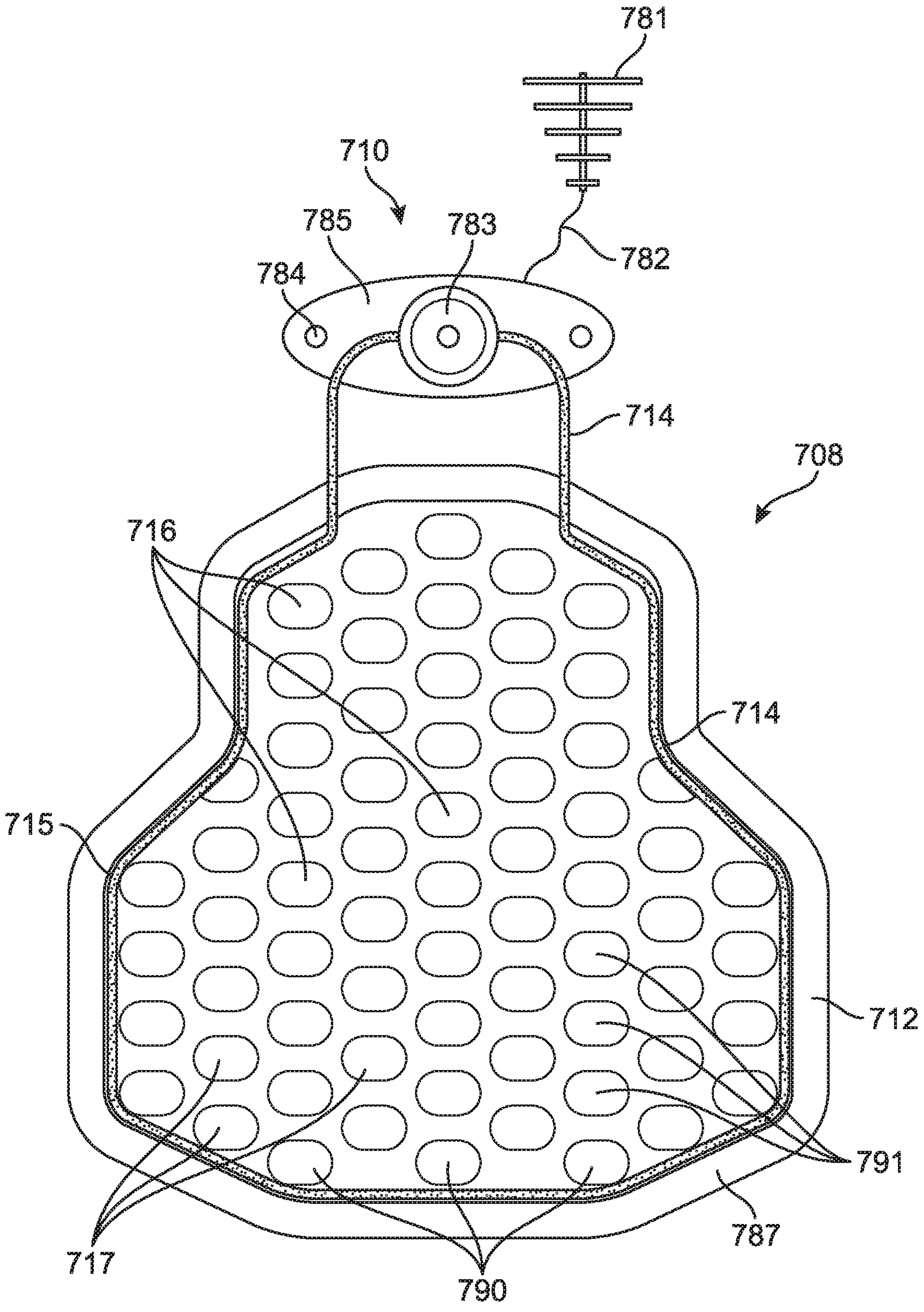
FIG. 12 shows a close-up view of a second embodiment of a padding system, where the filament surrounds all of the padding elements.

FIGS. 12 through 15 show a variety of other arrangements of the filament pattern, among other disclosed features. In FIG. 12, thirteenth padding system 708 includes eleventh spool 710 and tenth pad 712. Eleventh spool 710 includes second cylinder 783, second mounting plate 785, and second attachment 784. Eleventh spool 710 is also connected to input source second antenna 781 by second wire 782. In accordance with aspects herein, the input source second antenna 781 may be referred to as a "second input source." Tenth pad 712 includes tenth plurality of padding elements 716 and third base layer 787, with eleventh filament 714. In this particular embodiment, eleventh filament 714 encompasses all of tenth plurality of padding elements 716, such that the group of padding elements 717 encompassed by eleventh filament 714 is the same as the group of all of tenth plurality of padding elements 716. FIG. 11 also illustrates how some padding elements in the group 717 may be directly adjacent to eleventh filament 714, this group of padding elements is referred to as padding element group 790. Others of padding elements 717 may be surrounded by eleventh filament 714 without being directly adjacent to eleventh filament 714, this group of padding elements is referred to as padding group 791. Generally, second filament pattern 715 of eleventh filament 714 as shown in FIG. 11 will compress group 790 together and in towards group 791, such that all of padding elements 717 may be compressed together to increase the collective stiffness of tenth pad 712.

Figure 13:
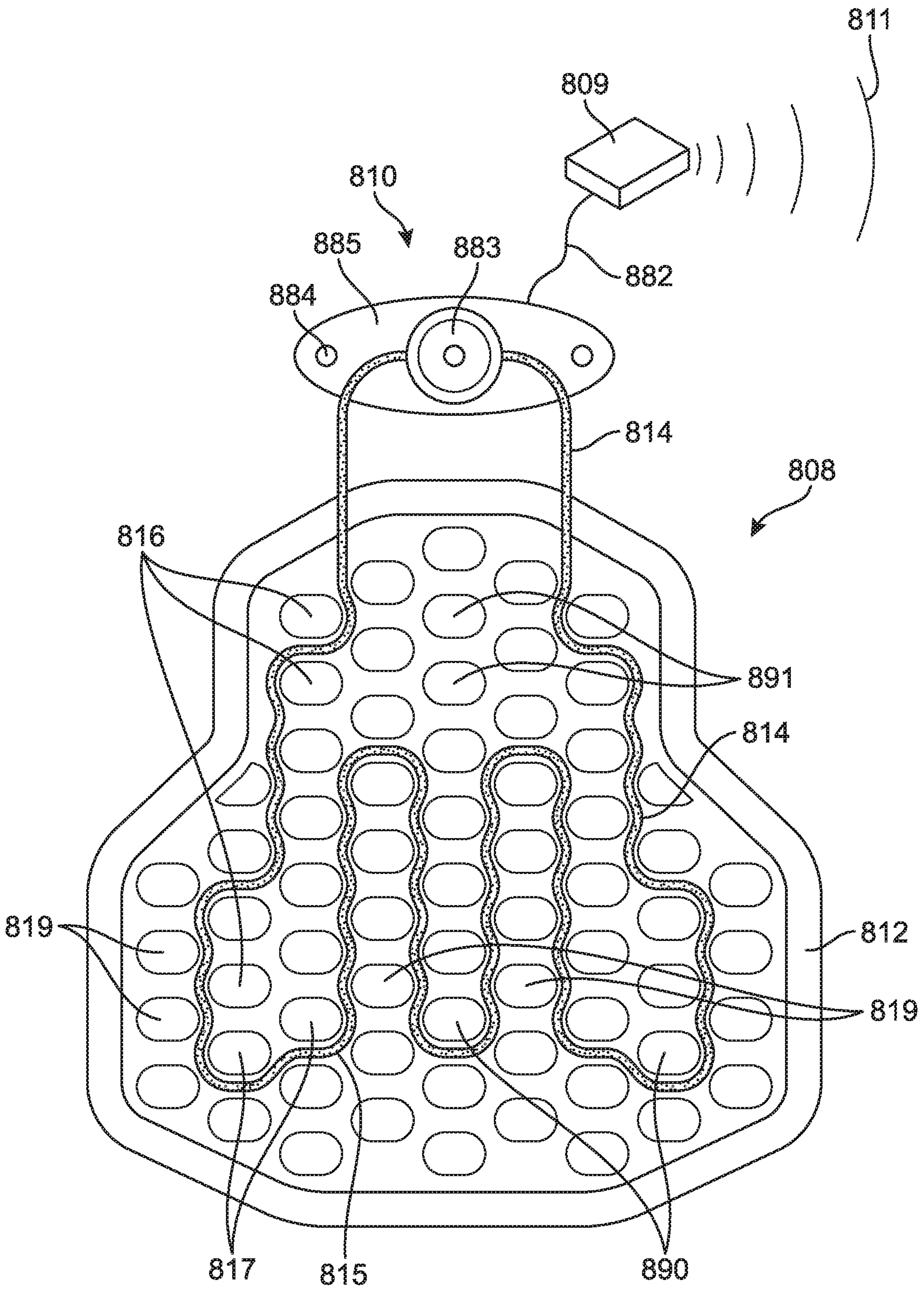
FIG. 13 shows a close-up view of a third embodiment of a padding system, where the filament surrounds fewer than all of the padding elements.

FIG. 13 shows yet another embodiment of a fourteenth padding system 808. Fourteenth padding system 808 includes twelfth spool 810, with third cylinder 883, third mounting plate 885, and third attachment 884. Twelfth spool 810 is also connected to third wire 882 which connects to a sixth sensor 809 that emits sixth sensor field 811. In this embodiment, twelfth spool 810 is hardwired to sixth sensor 809 by third wire 882. Sixth sensor 809 may be a sensor mounted on another aspect of the wearer, as shown in FIG. 4A with respect to first sensor 209. Alternatively, in some embodiments, sixth sensor 809 may be incorporated into the article of apparel containing fourteenth padding system 808. For example, a proximity sensor may be used for sixth sensor 809, and sixth sensor 809 may be incorporated into article of apparel adjacent to (or even under neither or on top of) the location of fourteenth padding system 808. In such embodiments, a proximity sensor sixth sensor 809 may detect an impending impact simply by (for example) sensing movement near the physical location of sixth sensor 809, thus simplifying the workings of fourteenth padding system 808 and obviating the need for a separate microprocessor to process information.

FIG. 13 also shows third filament pattern 815 of twelfth filament 814. In this embodiment, eleventh plurality of padding elements 816 may be grouped into padding elements 817 surrounded by twelfth filament 814 and padding elements 819 that are not surrounded by twelfth filament 814. Within group 817, padding elements which are in direct contact with twelfth filament 814 may be referred to as padding element group 890, while padding elements 817 which are not in direct contact with twelfth filament 814 may be referred to as padding element group 891. In this embodiment, padding element group 891 includes far fewer padding elements than padding element group 890. This configuration of third filament pattern 815 may result in twelfth filament 814 compressing padding element group 890 together in such a way as to create higher stiffness values in certain areas of the eleventh pad 812, while retaining flexibility in other certain areas of the eleventh pad 812. This may be particularly advantageous in order to isolate where on eleventh pad 812 increased stiffness is needed to protect from a particular type of impact.

Figure 14:
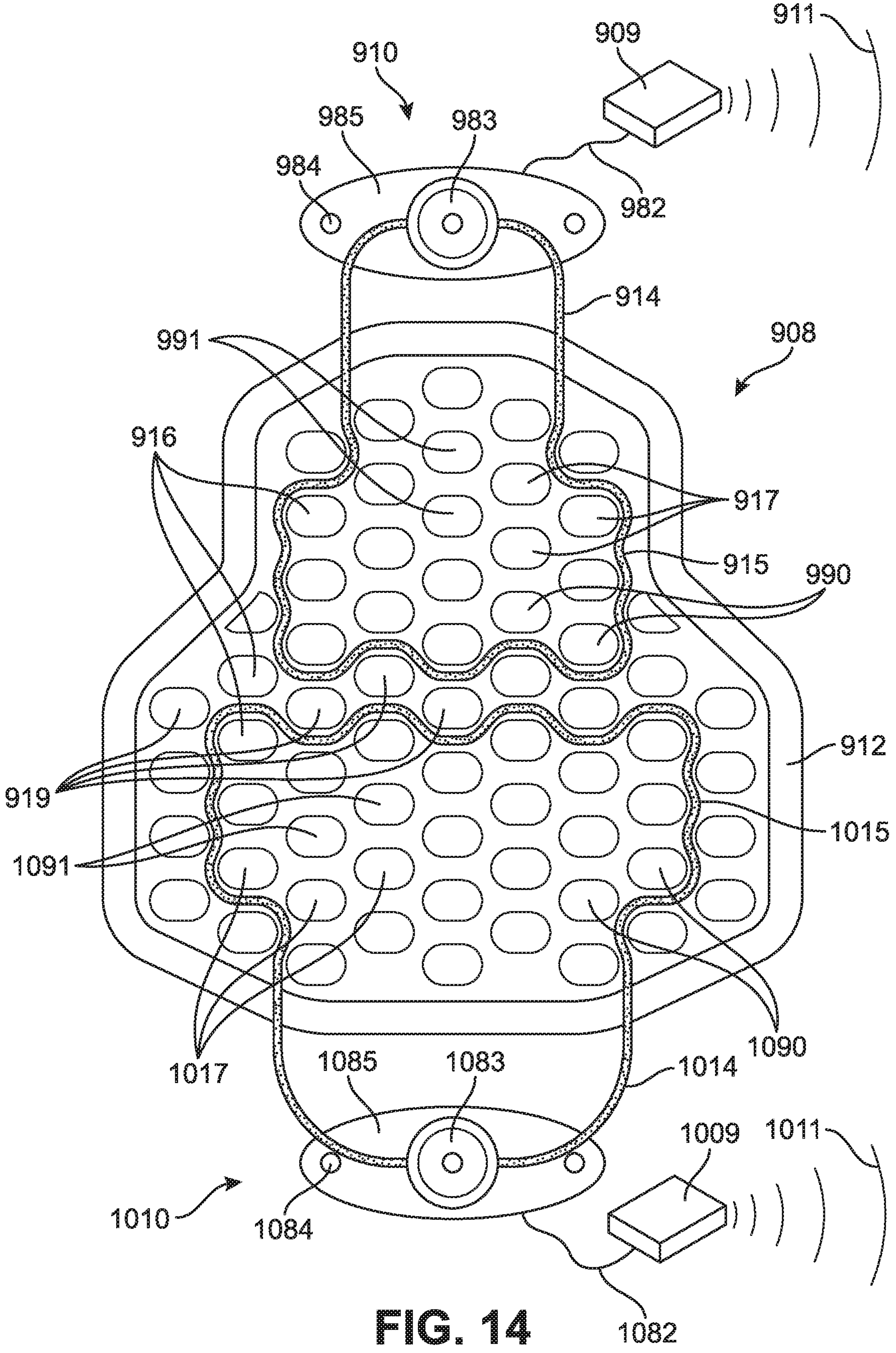
FIG. 14 shows a close-up view of fourth embodiment of a padding system, having two spools and two filaments.

Next, FIG. 14 shows an embodiment of a fifteenth padding system 908 with two spools, thirteenth spool 910 and fourteenth spool 1010 each surrounding different groups of twelfth plurality of padding elements 916 on twelfth pad 912. Thirteenth spool 910 is the first of two spools in fifteenth padding system 908, while fourteenth spool 1010 is the second of two spools in fifteenth padding system 908. Thirteenth spool 910 includes fourth cylinder 983, fourth mounting plate 985, and fourth attachment 984. Thirteenth spool 910 is also attached to seventh sensor 909 which emits seventh sensor field 911, and is connected by fourth wire 982. Seventh sensor 909 and related components may be substantially similar to sixth sensor 809 of fourteenth padding system 808 shown in FIG. 13 and discussed above. Thirteenth spool 910 is connected to thirteenth filament 914. Thirteenth filament 914 surrounds padding elements 917 in fourth filament pattern 915. Within padding elements 917, thirteenth filament 914 directly contacts padding elements 990 but does not directly contact padding elements 991.

However, unlike most other embodiments described in this disclosure, fifteenth padding system 908 also includes a second spool, fourteenth spool 1010. Fourteenth spool 1010 includes fifth cylinder 1083, fifth mounting plate 1085, and fifth attachment 1084. Eighth sensor 1009 is attached to fourteenth spool 1010 by fifth wire 1082, and emits eighth sensor field 1011. Fourteenth spool 1010 is connected to fourteenth filament 1014, which in turn surrounds padding elements 1017 in fifth filament pattern 1015. Within padding elements 1017, fourteenth filament 1014 directly touches padding elements 1090 but does not touch padding elements 1091. In this embodiment, padding elements 1017 and padding elements 917 are two non-overlapping groups of padding elements. In other words, none of plurality of padding elements 916 belongs to both group 917 and group 1017. This occurs because thirteenth filament 914 and fourteenth filament 1014 are arranged in fourth filament pattern 915 and fifth filament pattern 1015, respectively, that do not overlap each other. This type of embodiment may be advantageous for isolating a certain area of twelfth pad 912 to achieve increased stiffness on demand, while allowing the remainder of twelfth pad 912 to simultaneously be flexible. This embodiment is also similar to the embodiment shown in FIG. 9, as was discussed above.

Figure 15:
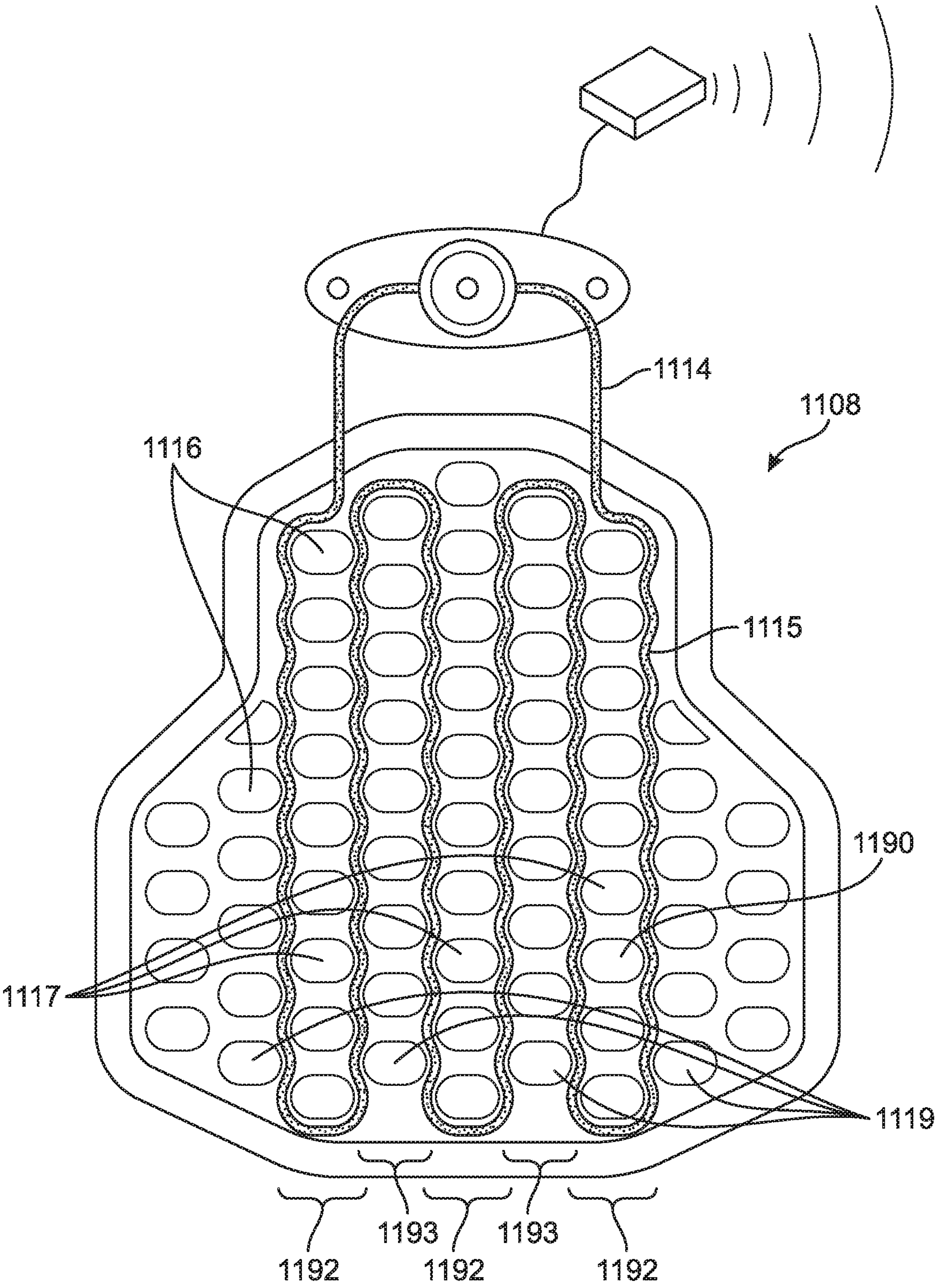
FIG. 15 shows a close-up view of a fifth embodiment of a padding system, where the filament is aligned with several rows of padding elements.

FIG. 15 shows yet another embodiment of a padding system sixteenth 1108. Sixteenth padding system 1108 may be substantially similar to fourteenth padding system 808, except that fifteenth filament 1114 may arranged in a different sixth filament pattern 1115 than third filament pattern 815. In the embodiment of FIG. 14, fifteenth filament 1114 may encompass some of thirteenth plurality of padding elements 1116 in such a manner that all padding elements so surrounded are in direct contact with fifteenth filament 1114.

Therefore, padding elements 1117 surrounded by fifteenth filament 1114 may be the same as padding element group 1190 that are surrounded by and in direct contact with fifteenth filament 1114. In the particular embodiment shown, sixth filament pattern 1115 is also configured so as to encompass entire rows 1192 of padding elements 1117. By alternating rows 1192 surrounded by fifteenth filament 1114 with rows 1193 that are not surrounded by fifteenth filament 1114, fifteenth filament 1114 may compress padding elements 1117 together in such a way that sixteenth padding system 1108 may have a relatively high stiffness in one direction (along the length of each row 1192) while also being entirely flexible in a different direction (orthogonal to each row 1192). This particular configuration may be advantageous to protecting from certain types of impacts, or protecting certain areas of a wearer's body, along one axis while still allowing for full range of motion along another axis.

Figure 16:
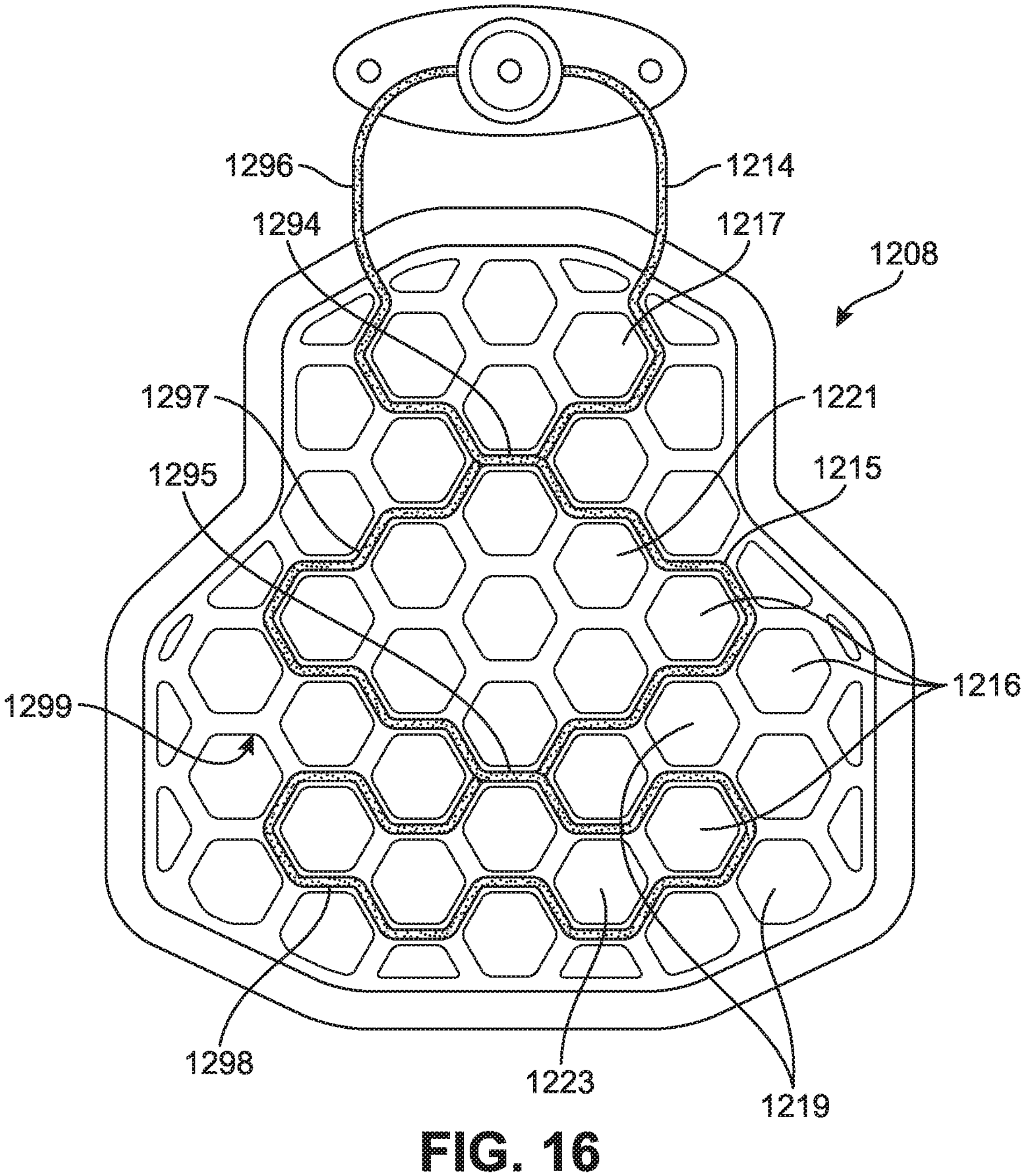
FIG. 16 shows a close-up view of a sixth embodiment of a padding system, where the padding elements have a different perimeter shape and the filament crosses back on itself.

FIG. 16 shows an embodiment of a seventeenth padding system 1208 that differs from other padding systems described above not only in the shape of seventh filament pattern 1215 of sixteenth filament 1214, but also with respect to perimeter shape 1299 of each of fourteenth plurality of padding elements 1216. Whereas various padding elements throughout this disclosure have been shown to have a generally oval perimeter shape, perimeter shape 1299 in FIG. 16 is an octagon. The octagon perimeter shape 1299 may be advantageous in that it allows for each side to be pressed flat against the side of an adjacent padding element when sixteenth filament 1214 constricts padding elements 1217 together. This may create a more secure interlocking grid of compressed padding elements, which may increase the stiffness of seventeenth padding system 1208 when seventeenth padding system 1208 is in its second configuration (not shown).

Furthermore, FIG. 16 also shows sixteenth filament 1214 with seventh filament pattern 1215 that includes points 1294 and 1295 where sixteenth filament 1214 crosses back over itself. As a result, crossover point 1294 creates first closed loop 1296 and second closed loop 1297. Crossover point 1295 then creates third closed loop 1298. Second closed loop 1297 surrounds padding elements 1221, while third closed loop surrounds padding elements 1223. Padding elements 1219 are not surrounded by any loop. The use of these closed loops may be particularly advantageous for compressing each group of padding elements together, without pressing the padding elements from one loop together with the padding elements of another loop. As a result, the stiffness of seventeenth padding system 1208 in a second configuration can be localized to particular zones among fourteenth plurality of padding elements 1216.

Figure 17:
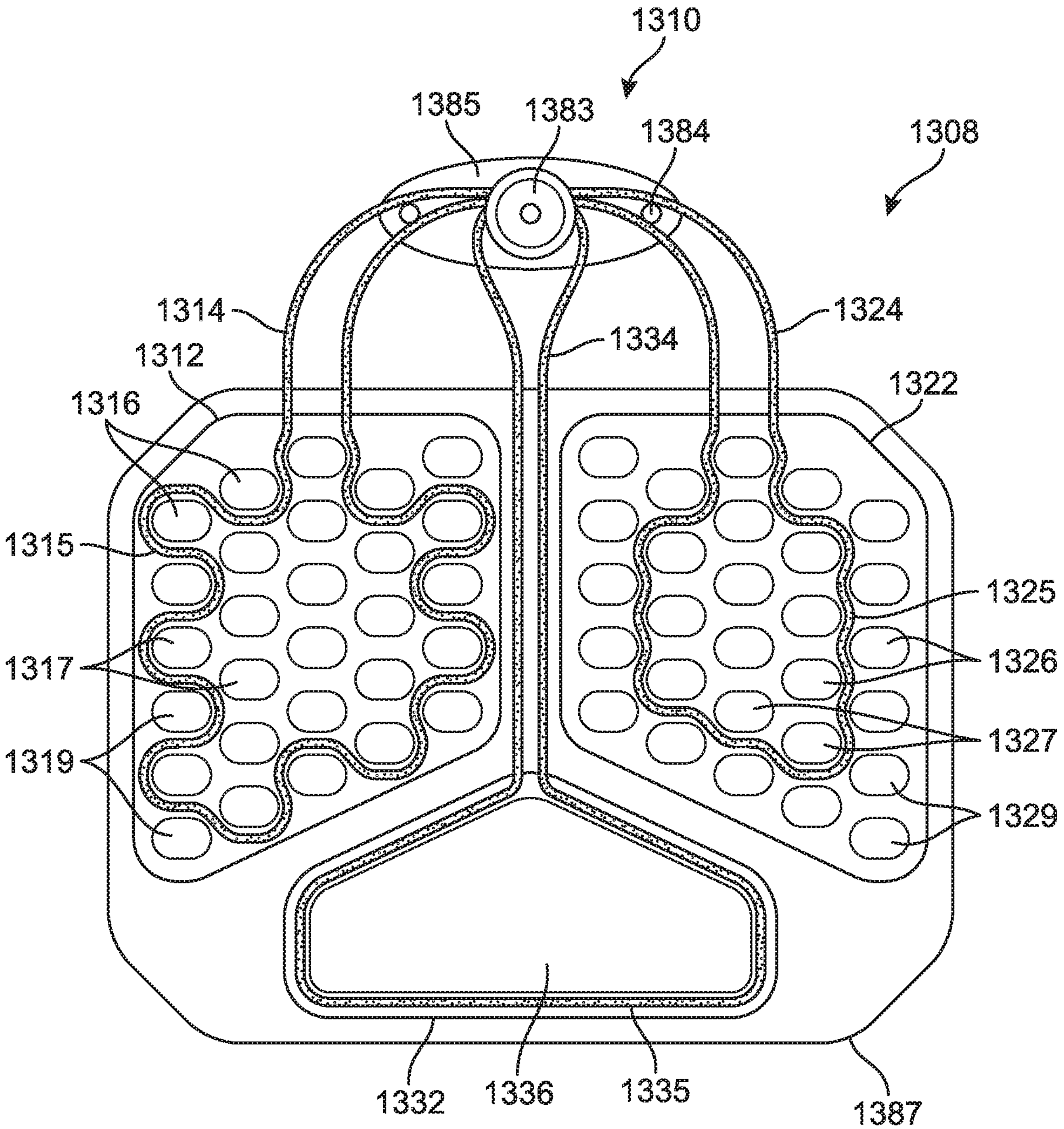
FIG. 17 shows a close-up view of a seventh embodiment of a padding system, including multiple sets of padding elements and multiple filaments.

FIG. 17 shows another embodiment of a eighteenth padding system 1308. Like fifteenth padding system 908, eighteenth padding system 1308 includes multiple filaments. However, in eighteenth padding system 1308 these multiple filaments are all connected to a single spool, fifteenth spool 1310. Eighteenth padding system includes three filaments and three pads. Specifically, seventeenth filament 1314 (the first of three filaments) is wound onto fifteenth spool 1310 and surrounds padding elements 1317 out of fifteenth plurality of padding elements 1316 on thirteenth pad 1312 (the first of three pads). Next, eighteenth filament 1324 (the second of three filaments) is wound onto fifteenth spool 1310 and surrounds padding elements 1327 out of sixteenth plurality of padding elements 1326 on fourteenth pad 1322 (the second of three pads). Finally, nineteenth filament 1334 (the third of three filaments) is wound onto fifteenth spool 1310 and surrounds padding elements 1336 on fifteenth pad 1332 (the third of three pads). Each of thirteenth pad 1312, fourteenth pad 1332, and fifteenth pad 1332 may all be mounted on fourth base layer 1387. The use of multiple pads with multiple filaments connected to a single spool may be advantageous to deliver stiffness to multiple specific zones of the overall eighteenth padding system 1308 simultaneously, while using areas between the multiple pads to achieve flexibility.

Figure 18:
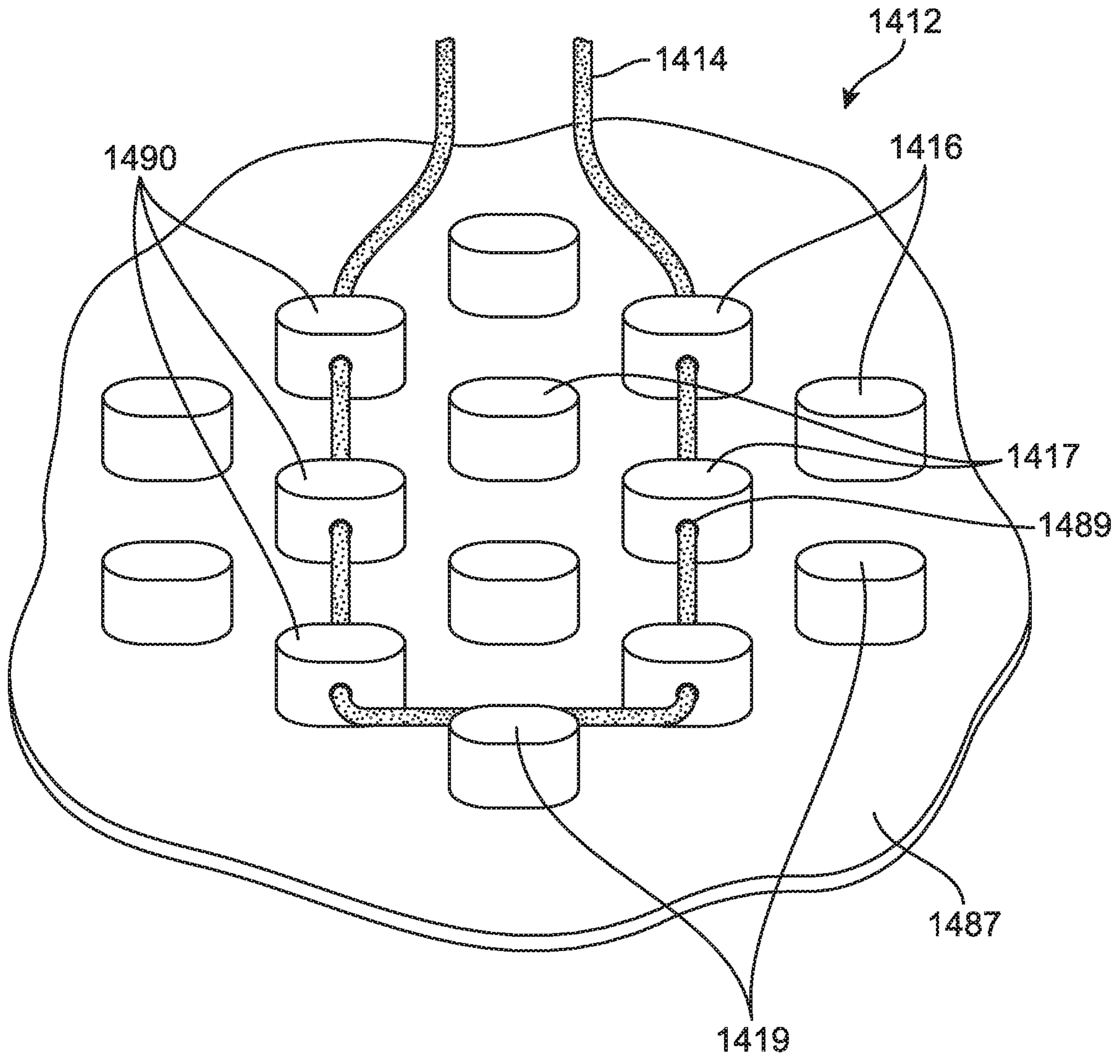
FIG. 18 shows an embodiment of the padding elements where the filament passes through several of them.

FIG. 18 shows an alternative embodiment of the padding elements, and their relation to a filament. In particular, FIG. 18 shows how certain padding elements 1490 may include a through-hole 1489 through which twentieth filament 1414 is threaded. Twentieth filament 1414 may therefore pull padding elements 1417 together by pulling padding elements 1490 inward from the center of each padding element 1490. Other components of sixteenth pad 1412, such as fifth base layer 1487 and padding elements 1419 not surrounded by twentieth filament 1414 may be as discussed variously above with respect to other embodiments. The embodiment having through-hole 1489 may be particularly advantageous in order to achieve increased force holding padding elements 1417 together when sixteenth pad 1412 is in a second configuration (not shown), thereby achieving increased stiffness. This configuration of the through-holes 1489 may be used in any of the discussed padding systems and articles of apparel.

Accordingly, as discussed above, the various embodiments shown in this disclosure may advantageously be used in sporting endeavors in order to providing impact protection when needed but also achieve flexibility when impact protection is not otherwise needed. The spool and filament system is advantageous in that it is robust in the face of stresses encountered in athletic activities, and is easily reversible. The sensor associated with the article of apparel may enable the padding system on the article of apparel to change from a low stiffness state to a high stiffness state before an impact occurs. Finally, the article of apparel and padding system may be tailored to suit the protective needs of a variety of sports.

Generally, unless this disclosure indicates to the contrary, any feature disclosed herein with respect to one embodiment may be combined with any other feature(s) disclosed with respect to any other embodiment, to form any combination or sub-combination thereof.

Although the embodiments in this disclosure depict articles of apparel with a dynamic padding system, it is contemplated that other embodiments could include dynamic systems in (for example) articles of footwear such as athletic sneakers or hiking books. In particular, any of the various features and embodiments disclosed herein may be used in conjunction with any features or disclosures in Rushbrook, U.S. Patent Publication Number US2015/0296922 published Oct. 22, 2015, now U.S. Pat. No. 9,380,834, filed Apr. 22, 2014, and titled "Article of Footwear with Dynamic Support" the entirety of which is herein incorporated by reference.

While various embodiments of the invention have been described, the description is intended to be exemplary, rather than limiting and it will be apparent to those of ordinary skill in the art that many more embodiments and implementations are possible that are within the scope of the invention. Accordingly, the invention is not to be restricted except in light of the attached claims and their equivalents. Also, various modifications and changes may be made within the scope of the attached claims.

Having thus described the invention, what is claimed is:

1. An article of apparel comprising:

an antenna configured to receive an electromagnetic signal from a proximity sensor;

a first dynamic padding system located at a first region of the article of apparel and a second dynamic padding system located at a second region of the article of apparel, wherein each of the first dynamic padding system and the second dynamic padding system is configured to reversibly change from a first state to a second state, each of the first dynamic padding system and the second dynamic padding system including:

a plurality of padding elements fixedly mounted on a base layer, a filament surrounding a first group of two or more of the plurality of padding elements in a first pattern, a spool, a portion of the filament being wound around the spool;

wherein the spool is configured to reversibly change the filament from a first configuration to a second configuration upon the antenna receiving the electromagnetic signal; and wherein when each of the first dynamic padding system and the second dynamic padding system is in the first state, the first group of two or more of the plurality of padding elements surrounded by the filament have a first distance between them such that the first dynamic padding system and the second dynamic padding system comprises a first stiffness and when the first dynamic padding system and the second dynamic padding system are in the second state, the first group of two or more of the plurality of padding elements surrounded by the filament have a second distance between them, such that the first dynamic padding system and the second dynamic padding system comprises a second stiffness, the second distance being less than the first distance;

wherein when the electromagnetic signal is received at the antenna, the first dynamic padding system changes from the first state to the second state, and the second dynamic padding system remains in the first state.

2. The article of apparel according to claim 1, wherein the first pattern encompasses a portion of the plurality of padding elements.

3. The article of apparel according to claim 1, wherein the antenna is mounted on an outer-facing surface of the article of apparel, and the proximity sensor transmits the electromagnetic signal to the antenna.

4. The article of apparel according to claim 3, wherein the proximity sensor is mounted on the outer-facing surface of the article of apparel.

5. An athletic equipment system comprising:

an article of apparel including a first dynamic padding system and a second dynamic padding system configured to reversibly change from a first state to a second state, each of the first dynamic padding system and the second dynamic padding system including a plurality of padding elements fixedly mounted on a base layer;

a filament surrounding two or more of the plurality of padding elements;

a proximity sensor configured to sense a position and a velocity of the article of apparel, sense the position and velocity of a target, compare the position and velocity of the article of apparel with the position and velocity of the target to determine whether the article of apparel and the target will impact, and transmit an electromagnetic signal to the first dynamic padding system, without transmitting a corresponding electromagnetic signal to the second dynamic padding system;

a spool, a portion of the filament being wound around the spool, the spool being configured to receive an input originating from the proximity sensor, wherein the spool is configured to reversibly change the filament from a first configuration to a second configuration upon receiving the input originating from the proximity sensor; and wherein when the first dynamic padding system and the second dynamic padding system are in the first state, the two or more of the plurality of padding elements which are surrounded by the filament have a first distance between them such that the first dynamic padding system and the second dynamic padding system comprises a first stiffness, and when the first dynamic padding system and the second dynamic padding system are in the second state, the two or more of the plurality of padding elements surrounded by the filament have a second distance between them, such that the first dynamic padding system and the second dynamic padding system comprise a second stiffness, where the second distance is less than the first distance.

6. The athletic equipment system of claim 5, wherein each of the first dynamic padding system and second dynamic padding system is located on a separate area of the article of apparel;

wherein each of the first dynamic padding system and second dynamic padding system respectively includes a plurality of padding elements fixedly mounted on a based layer; a filament surrounding two of more of the respective padding elements, the spool having a portion of the respective filament wound around the spool, each spool being configured to receive an input originating from the proximity sensor;

wherein each respective spool is configured to reversibly change each respective filament from a first configuration to a second configuration upon receiving the input originating from the proximity sensor;

wherein the two of more of the respective padding elements which are surrounded by each respective filament have a first distance between them when each filament is in the first configuration, and have a second distance between them when each filament is in the second configuration, where the second distance is less than the first distance; and wherein the proximity sensor is configured to transmit an electromagnetic signal to either the first dynamic padding system or the second padding system, based on a location of an impact between the article of apparel and the target.

7. The athletic equipment system of claim 5, wherein the proximity sensor is mounted on an outer-facing surface of the article of apparel, and the proximity sensor transmits the input to the spool via a wire.

8. The athletic equipment system of claim 5, wherein wherein the first dynamic padding system and the second dynamic padding system further comprises an antenna;

the proximity sensor is configured to transmit a electromagnetic signal; and the antenna is configured to receive the electromagnetic signal from the proximity sensor and deliver the input to the spool based on the electromagnetic signal.

9. The article of apparel according to claim 5, wherein the electromagnetic signal is to transition only the first dynamic padding system from the first state to the second state, while the second dynamic padding system remains in the first state.

10. An article of apparel comprising:

an antenna configured to receive an electromagnetic signal from a proximity sensor;

a first dynamic padding system located at a first region of the article of apparel and a second dynamic padding system located at a second region of the article of apparel, wherein the first dynamic padding system is configured to reversibly change from a first state to a second state, the first dynamic padding system including:

a plurality of padding elements fixedly mounted on a base layer, a filament surrounding a first group of two or more of the plurality of padding elements in a first pattern, a spool, a portion of the filament being wound around the spool;

wherein when the electromagnetic signal is received at the antenna, the first dynamic padding system changes from the first state to the second state.

11. The article of apparel of claim 10, wherein the second dynamic padding system is configured to reversibly change from a first state to a second state, the second dynamic padding system including:

a plurality of padding elements fixedly mounted on a base layer, a filament surrounding a first group of two or more of the plurality of padding elements in a first pattern, a spool, a portion of the filament being wound around the spool;

wherein the spool is configured to reversibly change the filament from a first configuration to a second configuration upon the antenna receiving the electromagnetic signal; and wherein when the second dynamic padding system is in the first state the first group of two or more of the plurality of padding elements surrounded by the filament have a first distance between them such that the second dynamic padding system comprises a first stiffness and when the second dynamic padding system is in the second state, the two or more of the plurality of padding elements surrounded by the filament have a second distance between them, such that the second dynamic padding system comprises a second stiffness, the second distance being less than the first distance;

wherein when the electromagnetic signal is received at the antenna, the second dynamic padding system changes from the first state to the second state.

12. The article of apparel of claim 10, wherein when the electromagnetic signal is received at the antenna, and the second dynamic padding system remains in the first state.

13. The article of apparel according to claim 10, wherein the first pattern encompasses a portion of the plurality of padding elements.

14. The article of apparel according to claim 10, wherein the antenna is mounted on an outer-facing surface of the article of apparel, and the proximity sensor transmits the electromagnetic signal to the antenna.

* * * * *